United States Patent
Fujitake et al.

(10) Patent No.: US 11,141,865 B1
(45) Date of Patent: Oct. 12, 2021

(54) ROBOT GRIPPER ASSEMBLY

(71) Applicant: Design Ready Controls, Inc., Brooklyn Park, MN (US)

(72) Inventors: Mark Ryan Fujitake, Maple Grove, MN (US); Christopher Mackedanz, Maple Lake, MN (US); Kaitlin Paige Hansen, St. Louis Park, MN (US); Austin Paul Strong, Waconia, MN (US); Troy Schmidtke, Hudson, WI (US)

(73) Assignee: Design Ready Controls, Inc., Brooklyn Park, MN (US)

( * ) Notice: Subject to any disclaimer, the term of this patent is extended or adjusted under 35 U.S.C. 154(b) by 201 days.

(21) Appl. No.: 16/541,361

(22) Filed: Aug. 15, 2019

(51) Int. Cl.
| B25J 15/00 | (2006.01) |
| B25J 15/10 | (2006.01) |
| B25J 9/02  | (2006.01) |
| B25J 13/08 | (2006.01) |

(52) U.S. Cl.
CPC ....... B25J 15/0042 (2013.01); B25J 15/0028 (2013.01); B25J 15/0052 (2013.01); B25J 15/103 (2013.01); B25J 15/106 (2013.01); B25J 9/023 (2013.01); B25J 13/085 (2013.01)

(58) Field of Classification Search
CPC .. B25J 15/0042; B25J 15/106; B25J 15/0052; B25J 15/0028; B25J 15/103; B25J 9/023; B25J 13/085
See application file for complete search history.

(56) References Cited

U.S. PATENT DOCUMENTS

| 4,611,846 A |   | 9/1986  | Feiber et al. |              |
|-------------|---|---------|---------------|--------------|
| 4,621,853 A |   | 11/1986 | Fink          |              |
| 4,663,821 A |   | 5/1987  | Campisi et al.|              |
| 4,696,503 A |   | 9/1987  | Collodel      |              |
| 4,699,414 A | * | 10/1987 | Jones         | B25J 15/026  |
|             |   |         |               | 294/119.1    |
| 4,819,978 A | * | 4/1989  | Scheinman     | B25J 13/082  |
|             |   |         |               | 294/119.1    |
| 5,020,964 A |   | 6/1991  | Hyatt et al.  |              |
| 5,253,912 A | * | 10/1993 | Andorlini     | B25J 15/02   |
|             |   |         |               | 29/732       |
| 5,320,301 A |   | 6/1994  | Cross         |              |
| 6,113,343 A | * | 9/2000  | Goldenberg    | B25J 5/005   |
|             |   |         |               | 239/587.2    |
| 7,041,141 B2| * | 5/2006  | Iversen       | A61F 2/54    |
|             |   |         |               | 623/64       |

(Continued)

FOREIGN PATENT DOCUMENTS

WO  2017028508 A1  2/2017

*Primary Examiner* — Stephen A Vu
(74) *Attorney, Agent, or Firm* — Haugen Law Firm PLLP

(57) ABSTRACT

A gripper for an articulable arm of an automated processing tool is described that is suitable for picking and placing objects on a wire harness peg board. The gripper includes at least two spaced apart opposing grips. Each grip further includes spaced apart protrusions. The opposing grips and protrusions actuate between open and closed positions. When in the closed position the opposing grips are capable of enclosing a perimeter of an object and may further support an underside of the object. The gripper may further grip a wire so that the automated processing tool may orient the wire and apply a constant upward, downward or lateral tension on the wire.

17 Claims, 22 Drawing Sheets

(56) References Cited

U.S. PATENT DOCUMENTS

| | | | | |
|---|---|---|---|---|
| 7,322,623 | B2 * | 1/2008 | Morton | H01R 43/20 |
| | | | | 294/119.1 |
| 7,565,223 | B2 | 7/2009 | Moldenhauer et al. | |
| 7,670,555 | B2 | 3/2010 | Hoover et al. | |
| 7,828,351 | B2 | 11/2010 | Baumstimler | |
| 7,860,610 | B2 | 12/2010 | Waldmann et al. | |
| 8,515,579 | B2 | 8/2013 | Alcazar et al. | |
| 8,556,687 | B2 | 10/2013 | Meyrahn et al. | |
| 8,646,822 | B2 | 2/2014 | Braun et al. | |
| 8,920,103 | B2 | 12/2014 | Schaller et al. | |
| 8,939,487 | B2 | 1/2015 | De Koning | |
| 8,979,155 | B2 | 3/2015 | Hedrick et al. | |
| 9,329,585 | B2 | 5/2016 | Furuya | |
| 9,461,569 | B2 | 10/2016 | Sejimo et al. | |
| 9,643,324 | B1 | 5/2017 | Roy et al. | |
| 9,650,849 | B2 | 5/2017 | Jelgert et al. | |
| 9,656,813 | B2 | 5/2017 | Dunkmann et al. | |
| 9,809,338 | B2 | 11/2017 | Gautheron | |
| 2016/0089793 | A1 | 3/2016 | Truebenbach | |
| 2016/0203890 | A1 | 7/2016 | Horiki et al. | |
| 2019/0039838 | A1 | 2/2019 | Curhan et al. | |

\* cited by examiner

ROBOT GRIPPER ASSEMBLY

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to gripping assemblies capable of grasping horizontally oriented wires, filaments or other objects that are utilized by automated processing equipment or tools. More particularly, the invention pertains to spaced apart grips that include offset protrusions that are particularly well suited for grasping a wire oriented in a horizontal position when an upward, downward or lateral tension is applied to the wire. The present invention further pertains to a plurality of spaced apart grips that actuate in unison and provide a gripping force that allows an automated processing tool to pull up, push down or drag a wire in a horizontal position without applying excessive clamping forces on the wire that tend to alter the insulation around the wires and even dent or otherwise damage the wires.

BACKGROUND

Over the years, automated equipment and tools have been utilized to pick and place objects during an automated process. Depending upon the object's shape, size, weight, and other factors, holding the object can prove to be a challenging task for the processing tool. The tool may be provided with an articulating clasp or clamp that applies a squeezing force at a single location or opposing points on the object to hold the object within the clasp or clamp. Although an increased force may reduce the likelihood of an object slipping in the tool clasp, the increased force may damage the object being held. By way of example, applying clamping forces on an insulated wire may tend to alter the insulation around the wires and even dent or otherwise damage the wires.

Further, during the automated process, it may be desirable to press an object into position when placing the object. An increase in clamping force may be required in order to keep the object from slipping within the clamp when a downward force or upward force is applied to the object. Further, the downward or upward force required to press the object may bend the object at a point adjacent to the clamp. The task of automatically picking and placing wires on a template or pegboard to make a wire harness may also prove to be challenging.

Generally, wiring harnesses or bundled wires have been incorporated into many tools, equipment, and machinery. Typically, the specifications or criteria for each wire in a harness or bundle is identified. Once the wire harness design is established, each wire is first cut to a desired length and then bundled together to form a wire harness. Wiring designs have been improved by analyzing and creating bundles of wires having optimal routing and organization of the wires within the tool, equipment, or machine to form an ideal wire harness. Although designing a wire harness has been automated, it is common to use a wire harness peg board to manually assemble a wire harness. The manual assembly of the wire harness requires the placement of wires one at a time and fixing the ends of the wire so that the wires may be pulled taut as they are placed on the peg board. In the past, specifications have required an extra amount of wire on each end that are later trimmed, to compensate for the variations in tension, type and number of pegs used, and length of wire. Also, fixing the ends of the wire may require an additional length of wire to allow for stripping or end finishing (for example, adding ferrules, connectors, lugs, etc.) of each wire after removal from the board.

Manual assembly of wire harnesses further increases potential for inconsistent routing of wires and inconsistent start/termination positions of each wire. The shortcomings of manual assembly may be overcome with the use of automated tools and equipment such as robotic aids. However, picking and placing wires with an articulable arm of a processing tool requires clamping of the wire with sufficient force to allow the tool or robot to drag the wire around various posts and into various clamping pegs oriented on a wire harness pegboard. Various peg designs may require placement of the wire between stanchions of the peg, however, placement of the wire in this form of peg may cause the wire to bend or otherwise interfere with the robotic clamp. Further, although clamping pegs have been improvised, the required clamping force tends to alter the insulation around the wires and even dent or otherwise damage the wires. The present invention provides a gripper capable of gripping wires that reduces the likelihood of bending the wires or denting the wire insulation when picking and placing wires on a wire harness peg board.

SUMMARY

Embodiments according to aspects of the invention allow for the automated placement of wires on a wire harness peg board without applying excessive clamping forces on the wire that tend to alter the insulation around the wires and even dent or otherwise damage the wires. The gripping device of the present invention is particularly well suited for use with a robot for gripping and releasing objects. The robotic gripper may comprise a variety of configurations having two spaced apart grips that actuate between open and closed positions. In an embodiment of the invention the gripper may include two identical halves that cooperate together to form the spaced apart grips.

In an exemplary embodiment of the invention the gripping device includes a gripper having spaced apart first and second grips. The gripper may be coupled to an actuator which may be coupled to a robot coupling to couple to a robotic arm. The first grip includes spaced apart first and second projections wherein the first projection of the first grip has a split tine and the second projection of the first grip has a single prong. Similarly, the second grip includes spaced apart first and second projections wherein the first projection of the second grip has a split tine and the second projection of the second grip has a single prong. The first grip and second grips are coupled to the actuator such that the first and second grips are interconnected and actuate in unison.

The embodiment of the invention may further include couplings having rigid braces that interconnect the second projection of the first grip with the first projection of the second grip and the first projection of the first grip with the second projection of the second grip. Although the coupling may comprise a unitary rigid bridge that interconnects together projections of the first and second grip, those skilled in the art will appreciate that the coupling could also comprise an interchangeable flexure or bridge fastened to the projections. The tine of each of the first and second grips may include a notch having a vertex adapted to align along a central axis of a horizontally oriented wire. When the gripper is oriented in the closed position a perimeter of the object would be fully contained by the projections of the first and second grips. Further, actuation of the gripper simultaneously increases or decreases a distance between opposing first and second projections of the first grip and a distance between opposing first and second projections of the second grip. A tip portion of each first and second projection of each first and second grip is offset from a center axis of a base portion of each first and second projection of each first and second grip. A wire, filament or object dispenser is provided that couples to the gripper adjacent the leading edge of the first grip.

Another embodiment of the robotic gripping device for use with a robot to pick and place wires of a wire harness onto an assembly peg board includes a gripper having spaced apart fingers that together pick and hold a horizontally oriented wire. The gripper has first and second grip halves wherein the first grip halve and second grip halve together form a gripping portion of the gripper and wherein at least one of the first grip halve and second grip halve actuates between an open and closed position. The first grip halve includes spaced apart first and second projections, wherein the first projection of the first grip halve has a split tine and the second projection of the first grip halve has a single prong.

Similarly, the second grip halve includes spaced apart first and second projections wherein the first projection of the second grip halve has a split tine and the second projection of the second grip halve has a single prong. The first projection of the first grip halve may be aligned adjacent the second projection of the second grip halve and the first projection of the second grip halve may be aligned adjacent a second projection of the first grip halve. In this manner the first projection of the first grip halve mates with the second projection of the second grip halve and the second projection of the first grip halve mates with the first projection of the second grip halve.

This embodiment of the invention may further include an actuator to actuate the gripper between an open and closed position and a robot coupling suitable for coupling the actuator and gripper to a robot arm. Actuation of the gripper increases or decreases the distance between opposing first and second grip halves. A wire dispenser may be positioned adjacent a leading grip edge of the gripper and coupled to the leading edge of the gripper. The wire dispenser may include a filament conduit positioned adjacent a leading grip edge of the gripper. The filament conduit may include a bowden tube positioned adjacent a leading grip edge of the gripper. The tine of the first grip halve and the tine of the second grip halve includes notches having vertexes adapted to align along a central axis of a horizontally oriented wire. A tip portion of each first and second projection of each first and second grip halve is offset from a central portion of the base of each first and second projection of each first and second grip halve.

In use the gripper may be used by an automated processing tool to grip an object, such as a wire filament or cylindrical rod. The user may use the gripper to deliver and place a filament in a desired location of an automated workplace. The user provides a gripper having a leading grip edge and a trailing grip edge, wherein the gripper is adapted for picking and placing a horizontally oriented filament. The gripper includes first and second grip halves that together form a gripping portion of the gripper and that actuate between an open and a closed position. The first grip halve has spaced apart first and second projections wherein the first projection has a split tine and the second projection has a single prong. Likewise, the second grip halve includes spaced apart first and second projections wherein the first projection has a split tine and the second projection has a single prong. When the first and second halves are coupled to the actuator the first projection of the first grip halve is aligned adjacent the leading grip edge of the gripper and the first projection of the second grip halve is aligned adjacent the trailing edge of the gripper.

Further, the user loads a filament or wire into a filament dispenser positioned adjacent to the leading grip edge of the gripper. The gripper is actuated to grip an end of the filament with the gripper. The gripper may be positioned above a peg and then moved downwards so that an end of the filament is held by the peg or fixed within the workplace at a first position. The gripper then releases a grip on the filament and moves to a second position while maintaining the filament dispenser at a leading travel edge of the gripper. The wire or filament exits from the filament tube at the leading edge of the gripper as the gripper moves from the first position to the second position. In this manner the filament is placed on the pegboard without requiring a pulling of the wire to keep the wire taught between pegs. The filament is re-gripped and the gripper may move to fix the wire within a second peg. The steps of gripping, moving, gripping, and placing wires may be repeated until the wire is completely routed in desired locations along the workpiece. The pegs used on a pegboard of the workplace may be of a passive, bi-directional filament retaining type.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
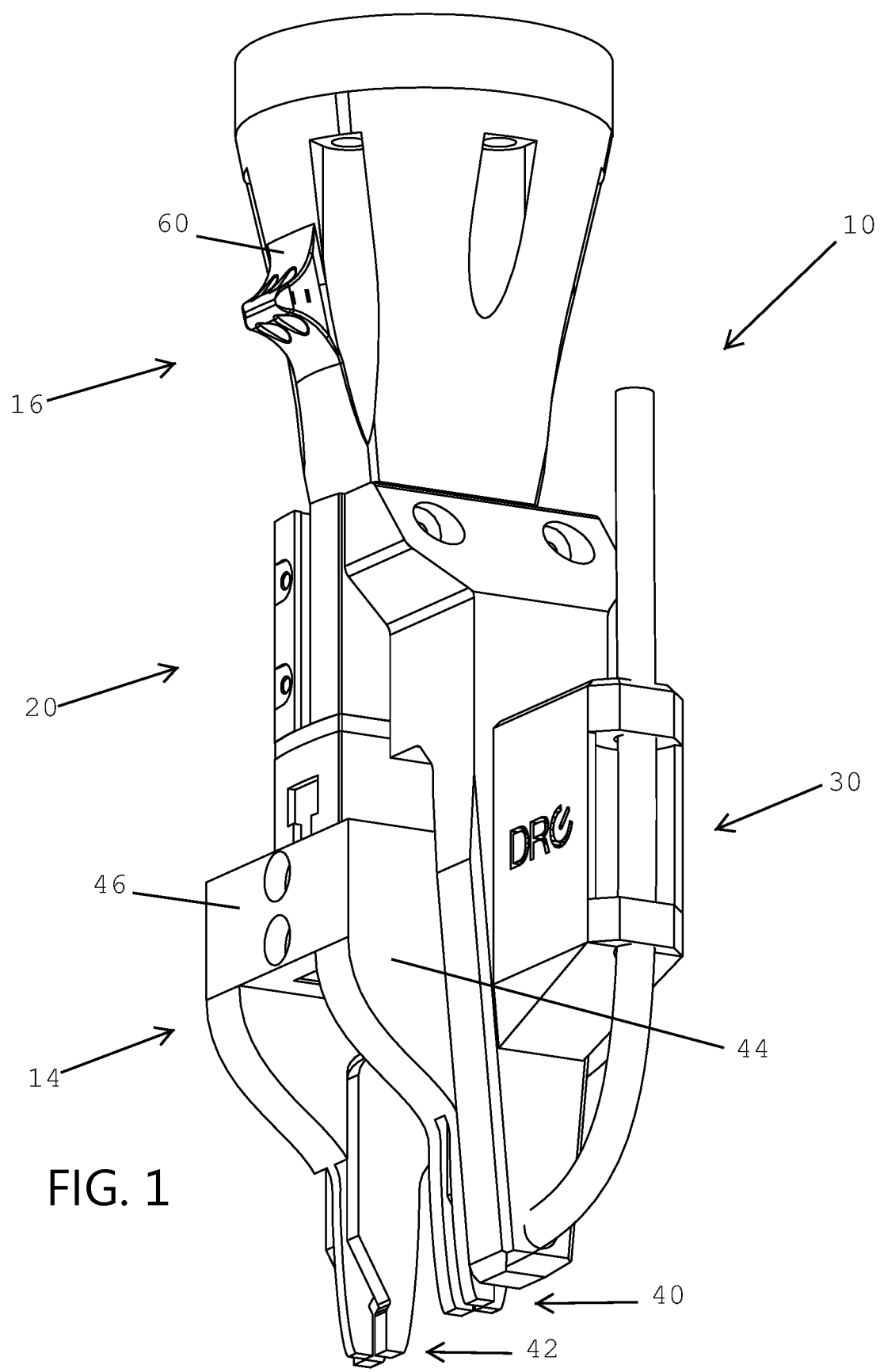
FIG. 1 is a front right perspective view of an embodiment of the object gripping device of the present invention.
Figure 2:
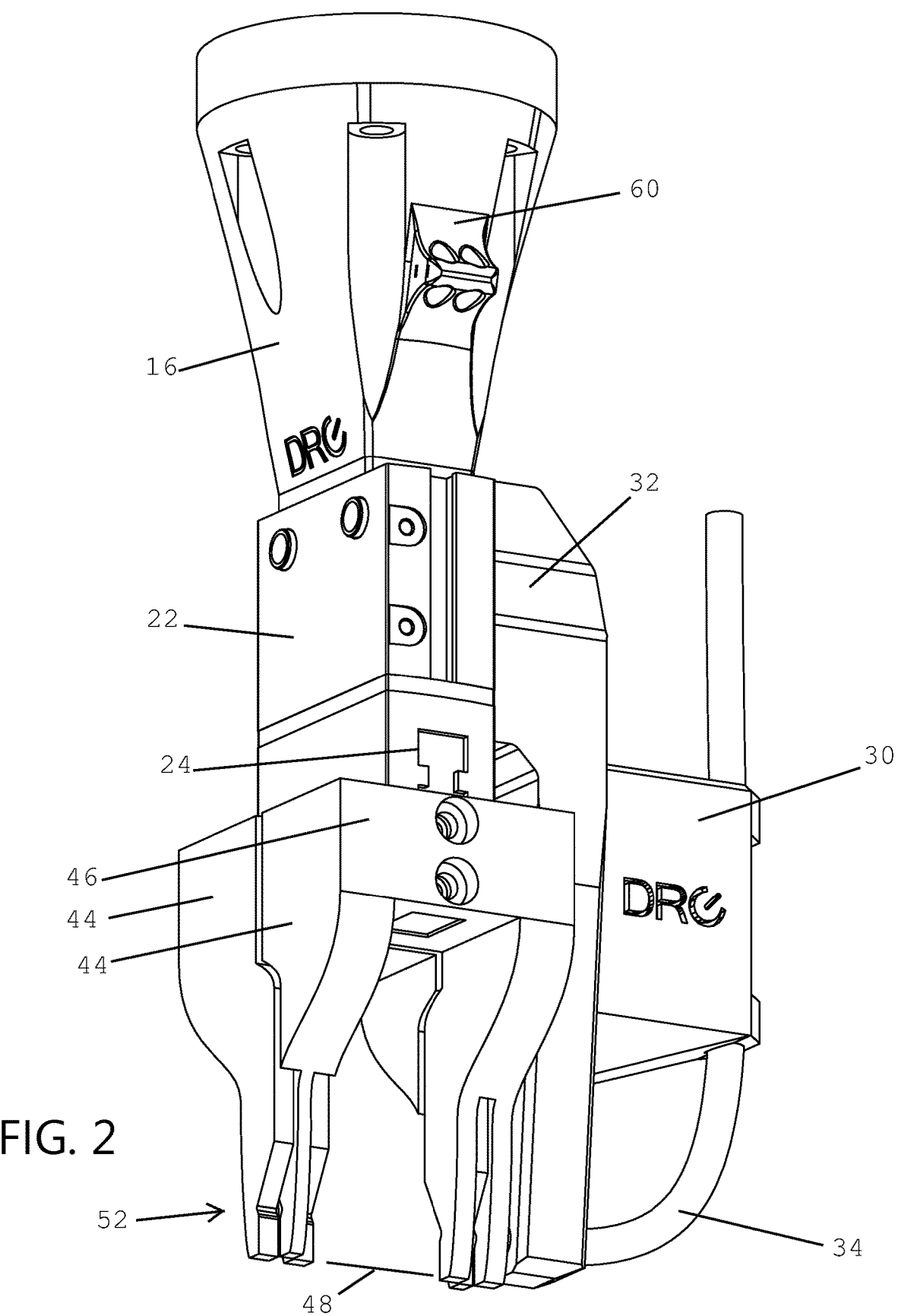
FIG. 2 is a front left perspective view of the object gripping device of the type shown in FIG. 1.
Figure 3:
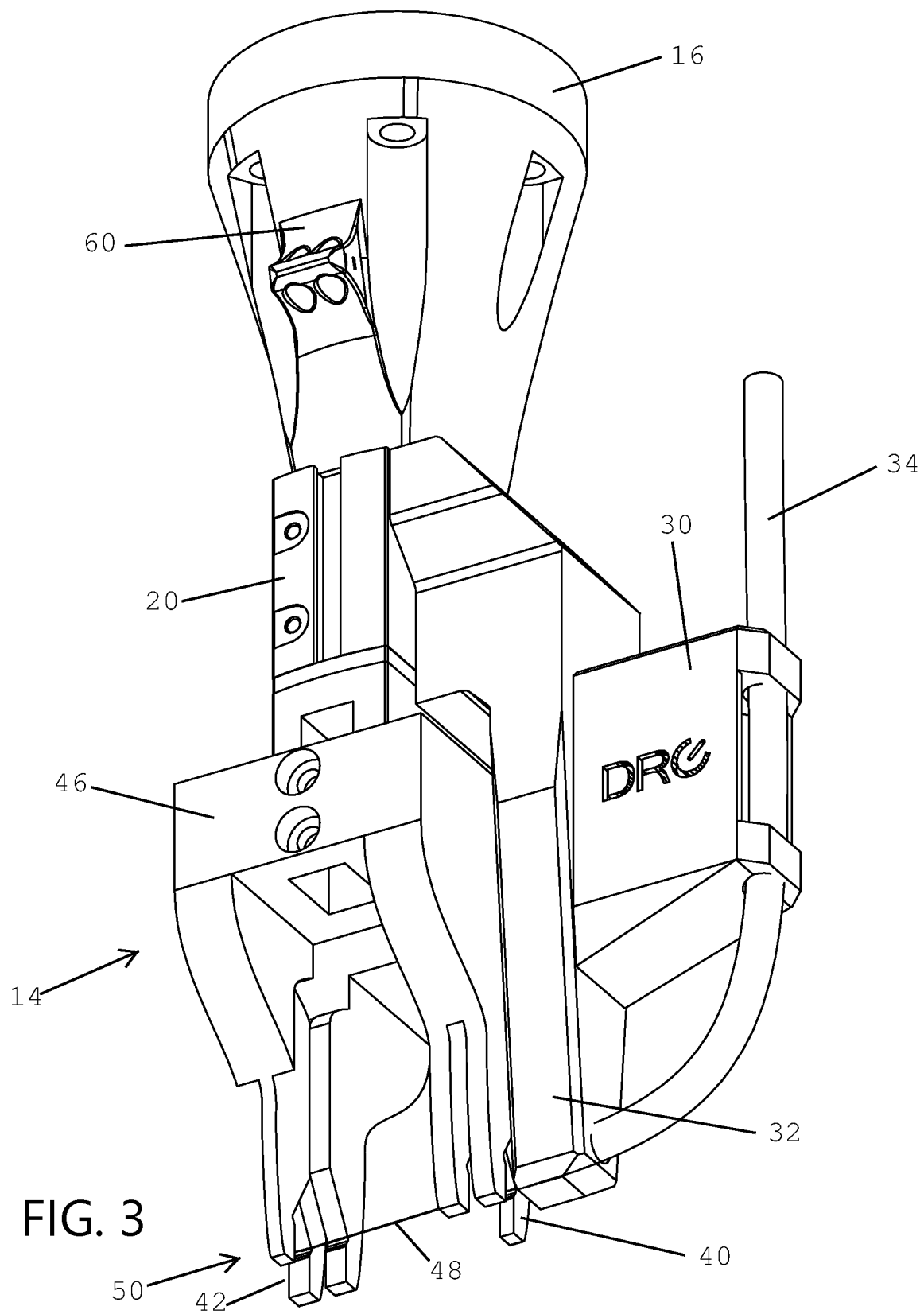
FIG. 3 is a front perspective view of an object gripping device of the present invention.
Figure 4:
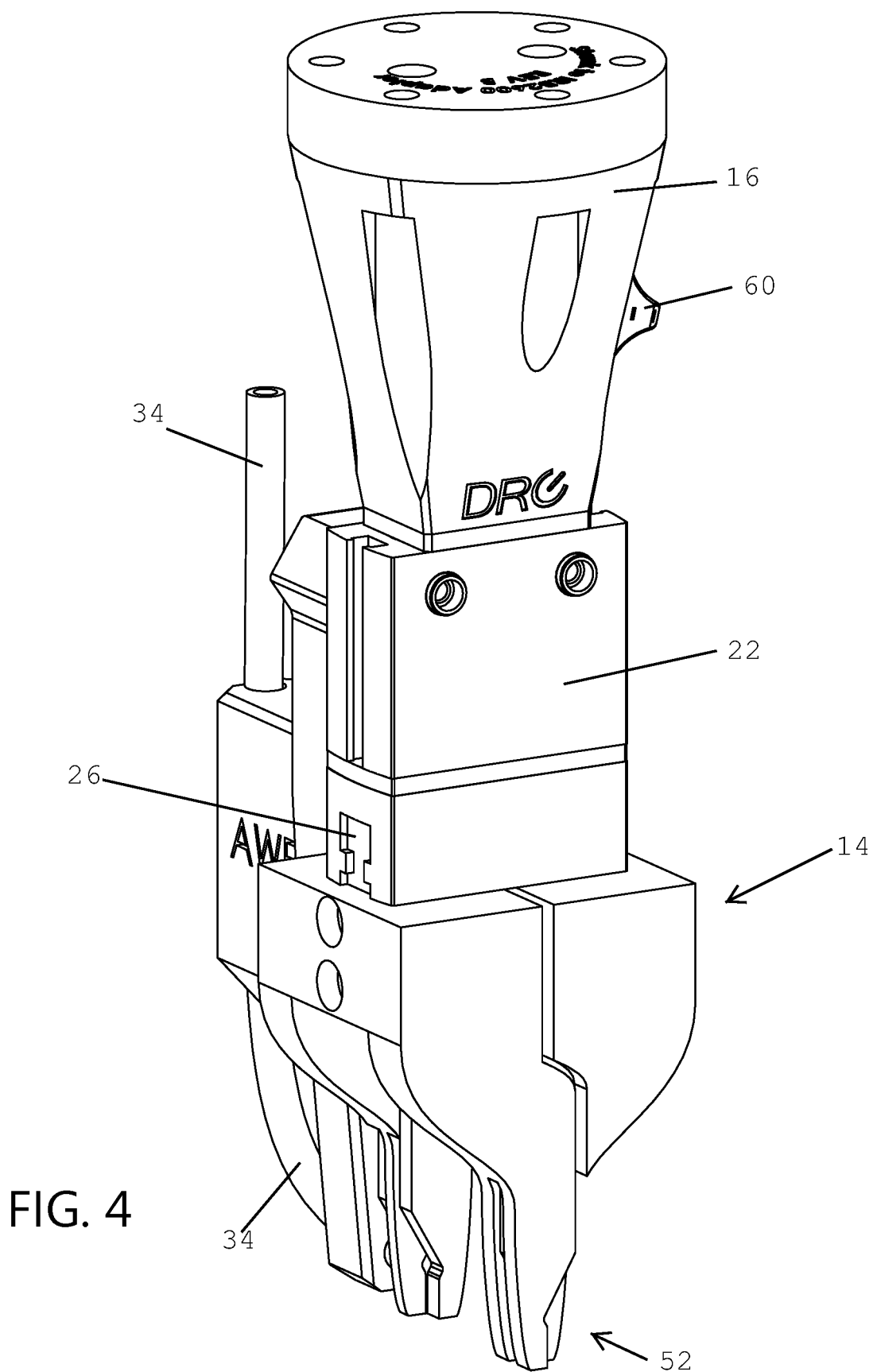
FIG. 4 is a left back side perspective view of an object gripping device of the present invention having the grips oriented in a closed position.
Figure 5:
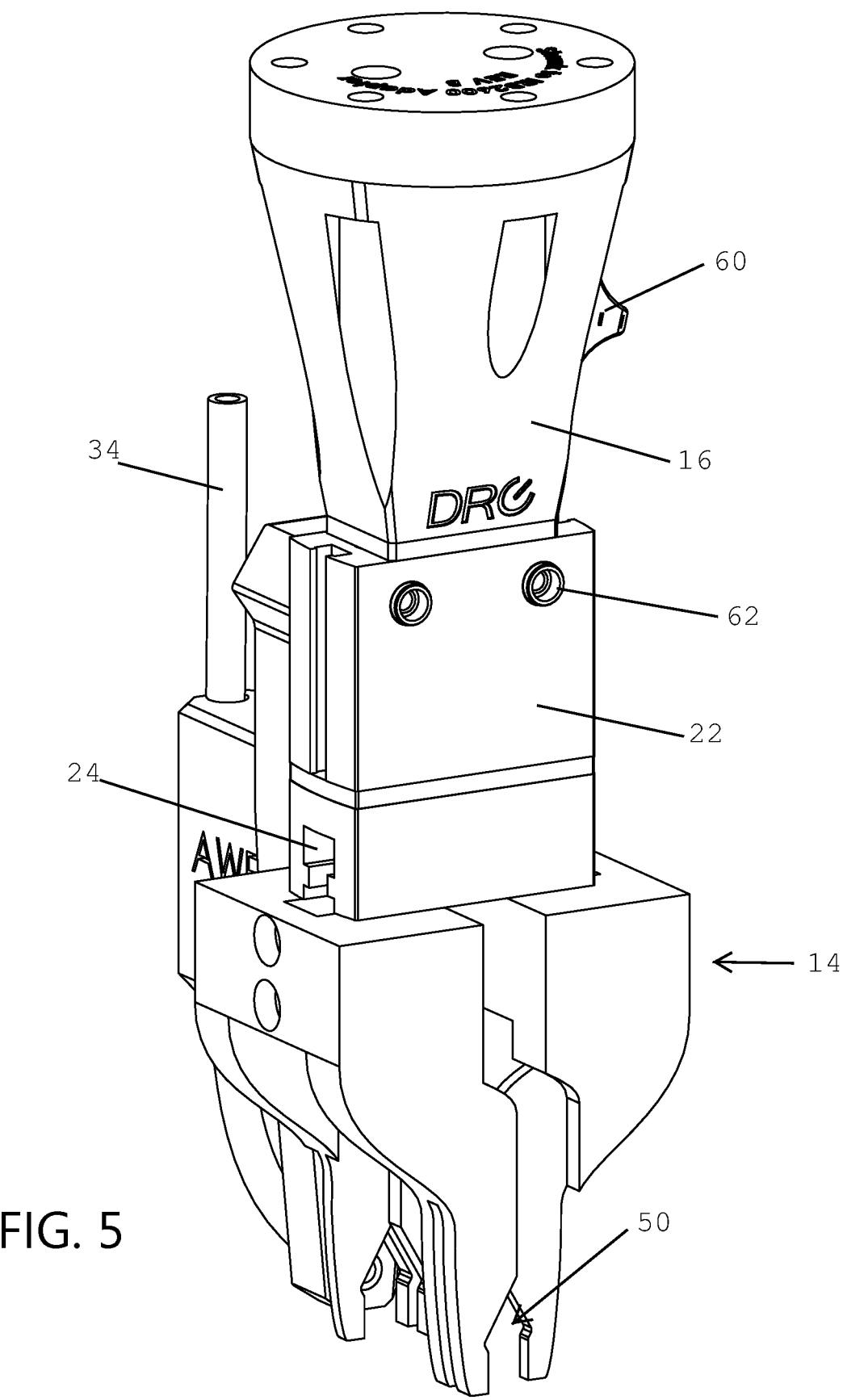
FIG. 5 is a left back side perspective view of the object gripping device of the type shown in FIG. 4 and having the grips oriented in an open position.

The following description provides detail of various embodiments of the invention, one or more examples of which are set forth below. Each of these embodiments are provided by way of explanation of the invention, and are not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Embodiments of the robotic gripper of the present invention are particularly well suited for assembling wire harnesses utilizing press and hold pegs on a wire harness peg board. The gripper is capable of holding a wire on either side of a peg while the wire is pressed into the peg. The gripper is further capable of handling many different wire gauges and is able to pick and place the wire without denting the exterior casing of the wires. In addition, the gripper includes a wire dispenser that orients the wire horizontally at the leading edge of the gripper. Orienting the wire at the leading edge rather than the trailing edge of the gripper requires less wire tension by the pegs since the wire is not being dragged through or around pegs. This reduction in required tension increases the predictability of the required length of each wire to be placed.

Additionally, the apparatus of the present invention is particularly well suited for use in an automated assembly of electrical wire harnesses. The robotic gripper of the present invention cooperates well with various configurations of wire holding devices and pegs of a wire harness pegboard. Rather than pulling the wires around the peg board, the present invention lays the wire down in the desired location thereby ensuring the ends of each wire of the wire harness are positioned in the desired location without the need for wire trimming.

With reference to Figures, embodiments according to aspects of the invention will be described in conjunction with variations of the gripper 14 of gripping device 10 shown in these figures. FIGS. 1-5 illustrates the gripping device 10 in various orientations. The gripping device 10 generally includes a robotic coupling 16, actuator 20, wire dispenser 30, and gripper 14. The robotic coupling 16 includes apertures to mount the coupling to a robotic arm. The actuator 20 is mounted to the robotic coupling and bracket 60 on the robotic coupling is useful to secure actuator pneumatic conduits. The wire dispenser 30 is mounted to the robotic coupling via a support 32. The wire dispenser includes a sheath or filament conduit 34 (a portion of which is illustrated). The entire length of filament or wire is loaded or fed into the sheath 34 prior to laying down the wire on a peg board 80. The filament conduit 34 may be coiled and secured to the robot arm. The bend in the conduit 34 near the leading edge 40 of the gripper 14 provides sufficient resistance against the filament or wire to keep the wire taught as it is routed around pegs on a peg board 80. A sheath 34 of suitable construction is known to those skilled in the art as a Bowden tube.

The gripper 14 includes sides 46 and ends 44. The gripper 14 actuates between an open position 50 and a closed position 52. When in a closed position 52, a central axis 48 of a horizontal wire is captured and held in a horizontal orientation within the gripper 14. A filament extends from the sheath 34 at the leading edge 40 of the gripper 14. When engaging a wire or filament to a suitable peg 90, such as the one shown in FIG. 21, the leading edge 40 is positioned on a front side of the peg 90 and the trailing edge 42 of the gripper 14 is positioned on the back or opposing side of the peg. In this manner, the gripper 14 may press a wire into the peg and then the gripper is actuated to the open position. The robot lifts the gripper upward and filament extends out the sheath 34. The robot then moves the leading edge forward to the next desired position on the pegboard 80. The filament trails out of the sheath 34 at the trailing edge 42 of the gripper 14. The sheath 34 is suitable for use with many gauges of wire including those in the range between 12-20 gauge wire. Those skilled in the art will recognize a further advantage to the sheath positioned at the leading edge of the gripper is that multiple wires may be placed on the peg board 80 without the wire and gripper becoming entangled in prior positioned wires.

Figure 6:
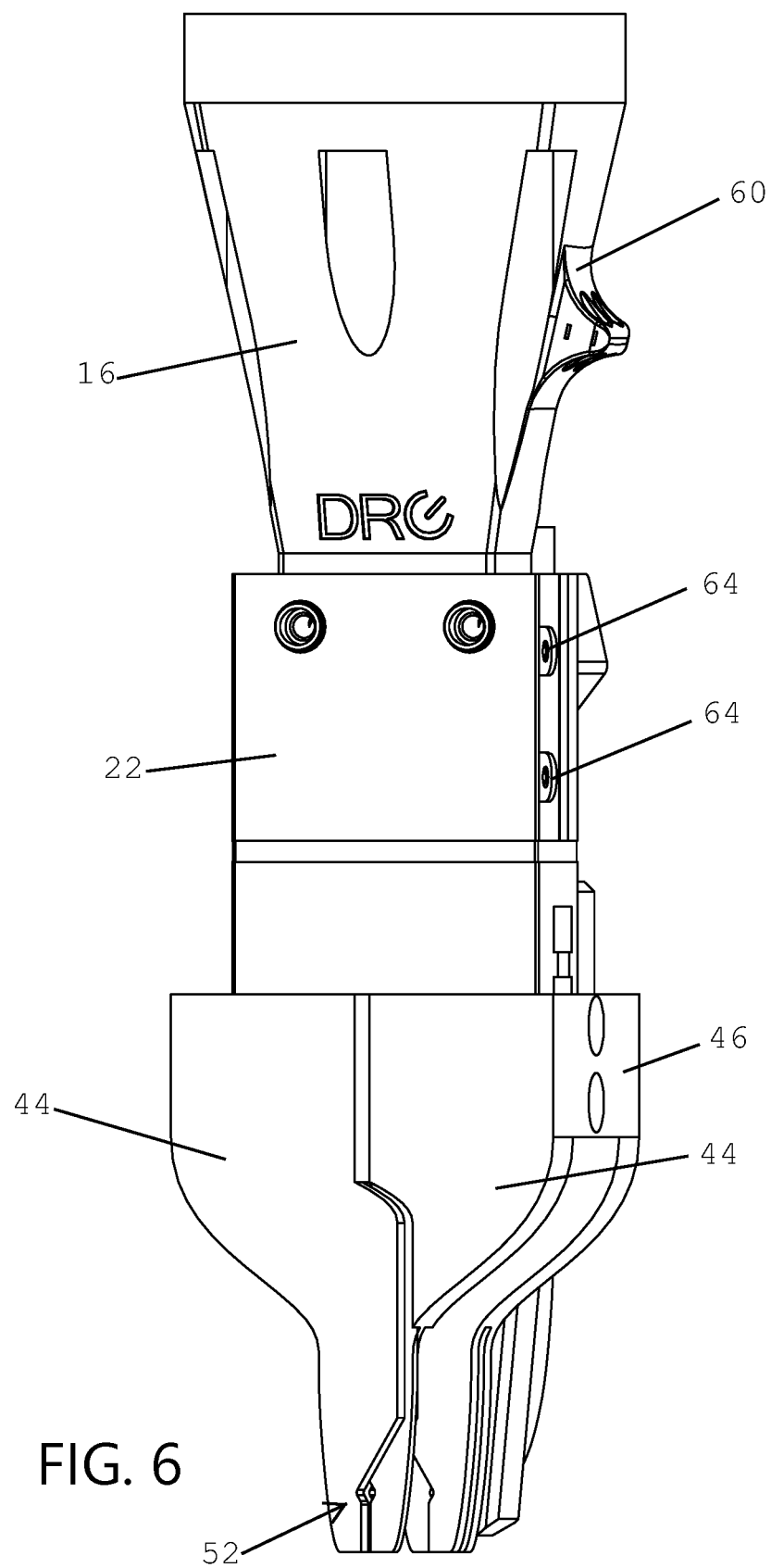
FIG. 6 is a left front side perspective view of an object gripping device of the present invention showing the grips oriented in a closed position.
Figure 7:
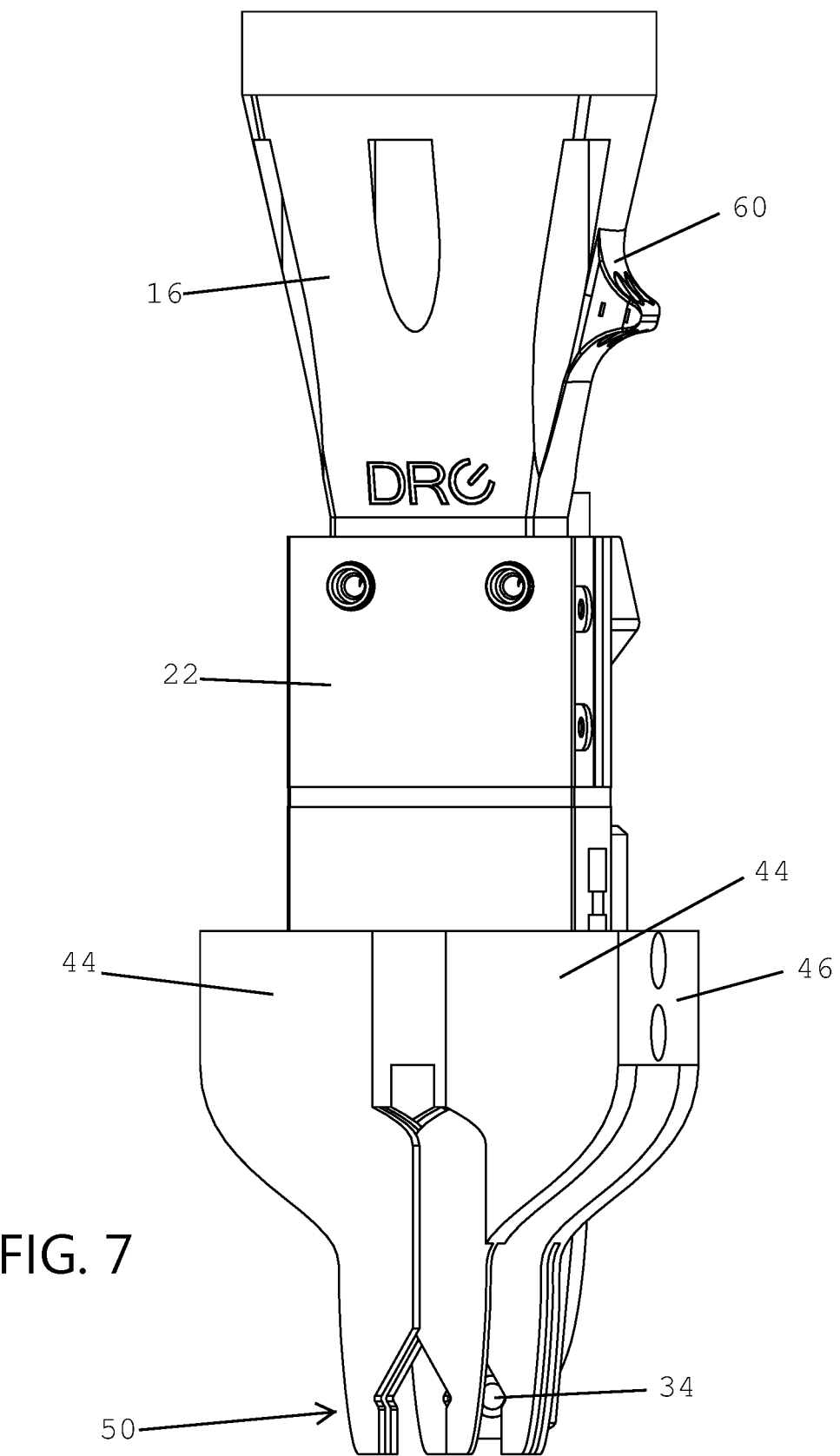
FIG. 7 is a left front side perspective view of an object gripping device of the type shown in FIG. 6 and having the grips oriented in the open position.
Figure 8:
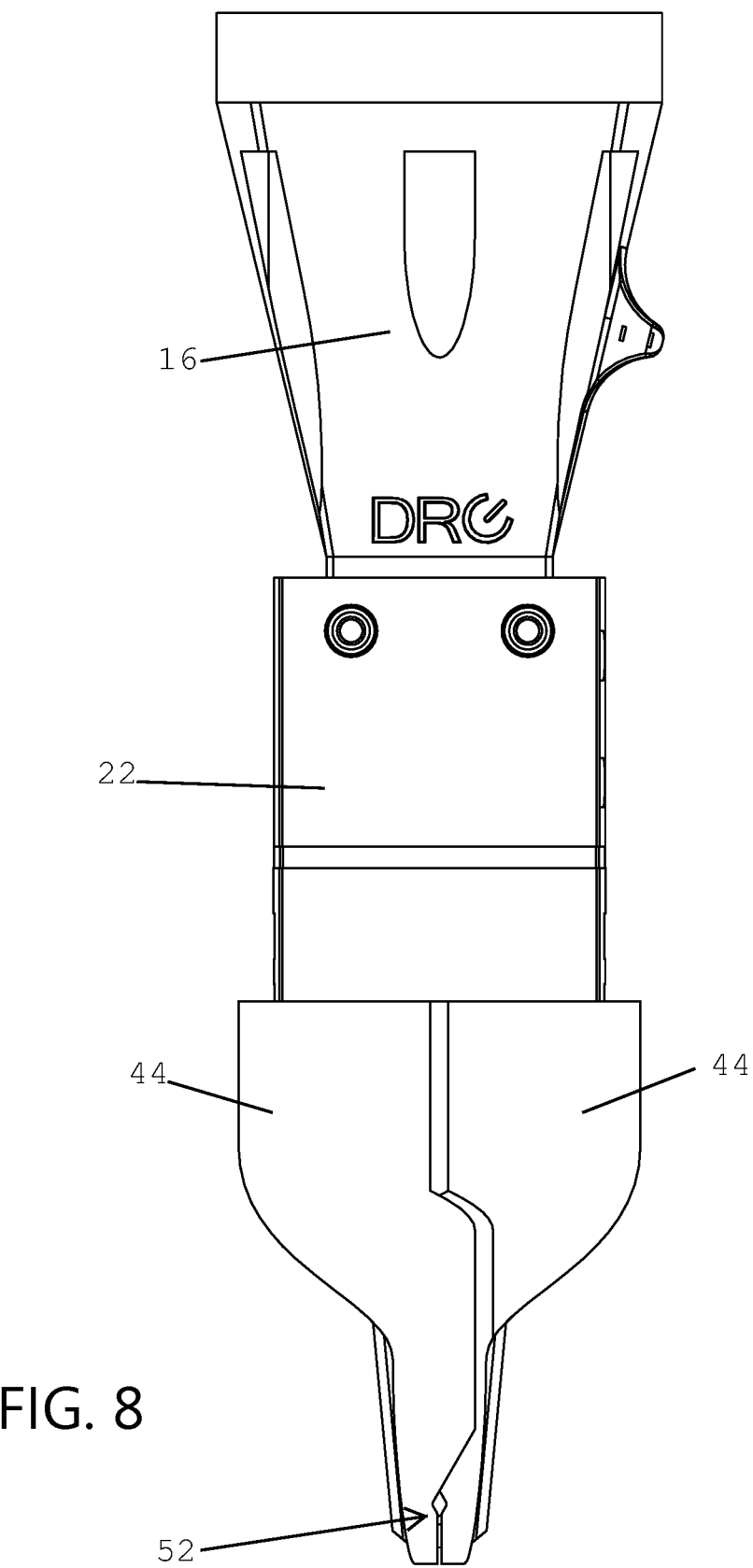
FIG. 8 is a left side perspective view of an object gripping device of the present invention showing the grips oriented in a closed position.
Figure 9:
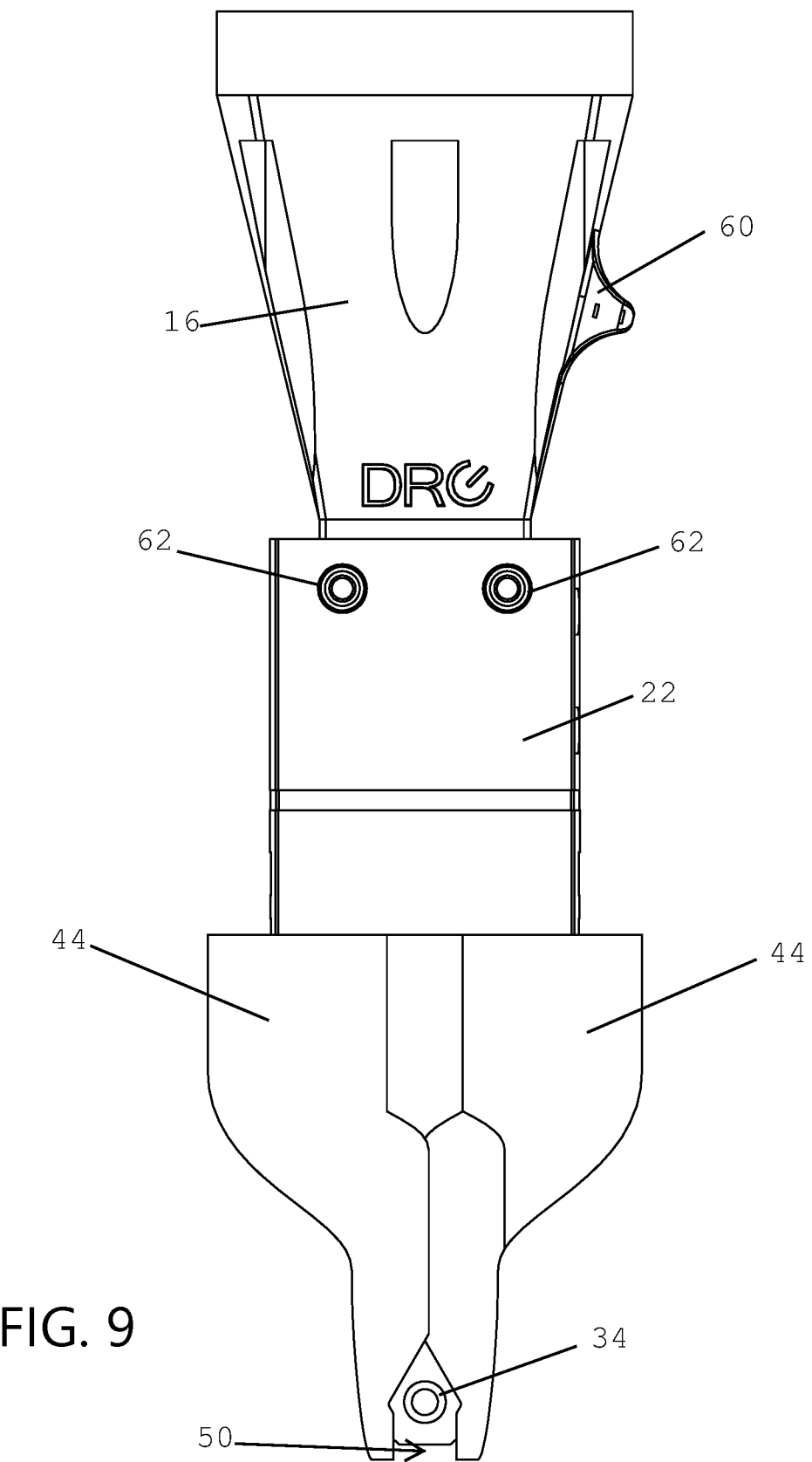
FIG. 9 is a left side perspective view of an object gripping device of the type shown in FIG. 8 and having the grips oriented in the open position.
Figure 10:
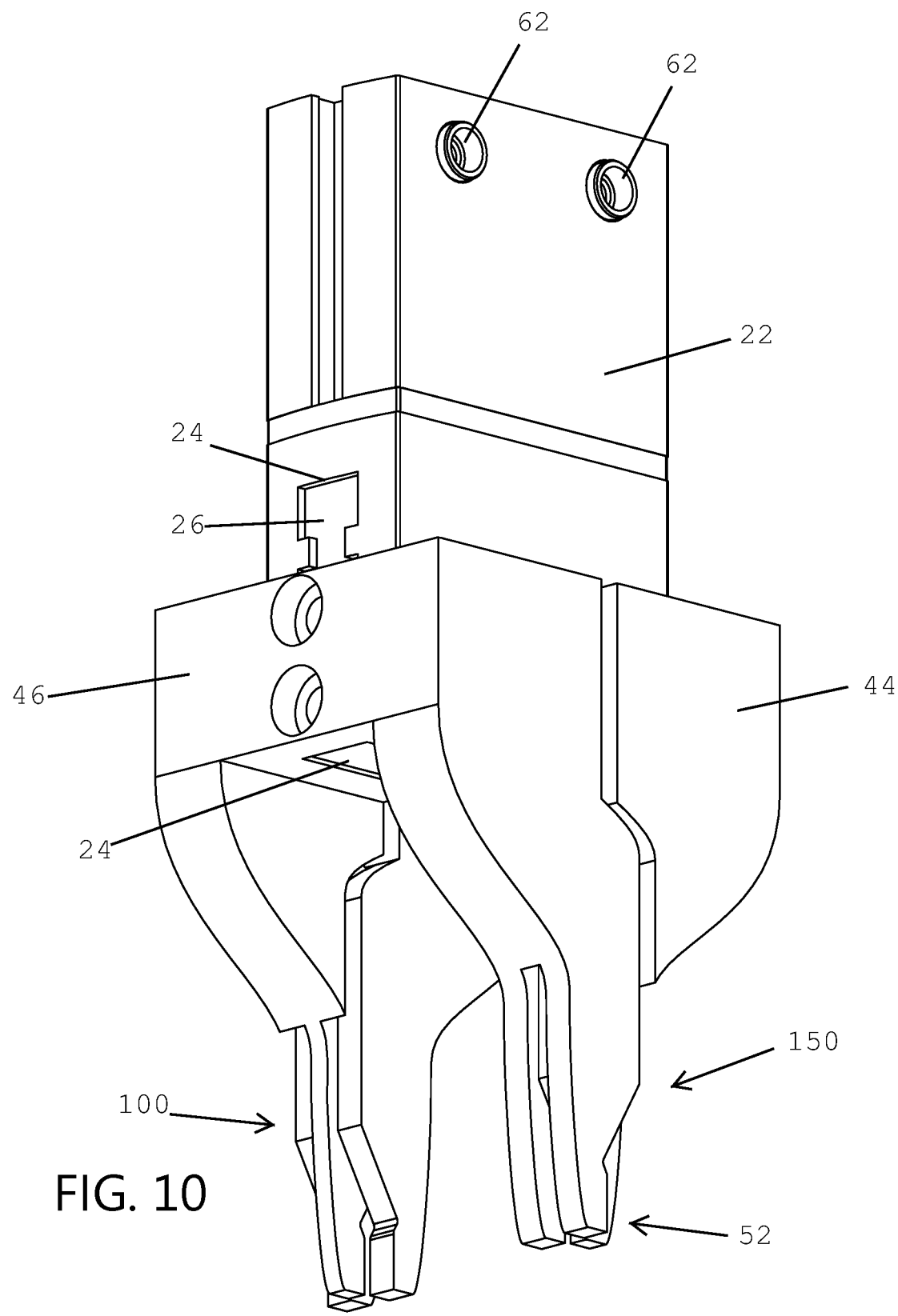
FIG. 10 is a perspective view of the gripper in combination with an actuator in accordance with the present invention shown in a closed position.
Figure 11:
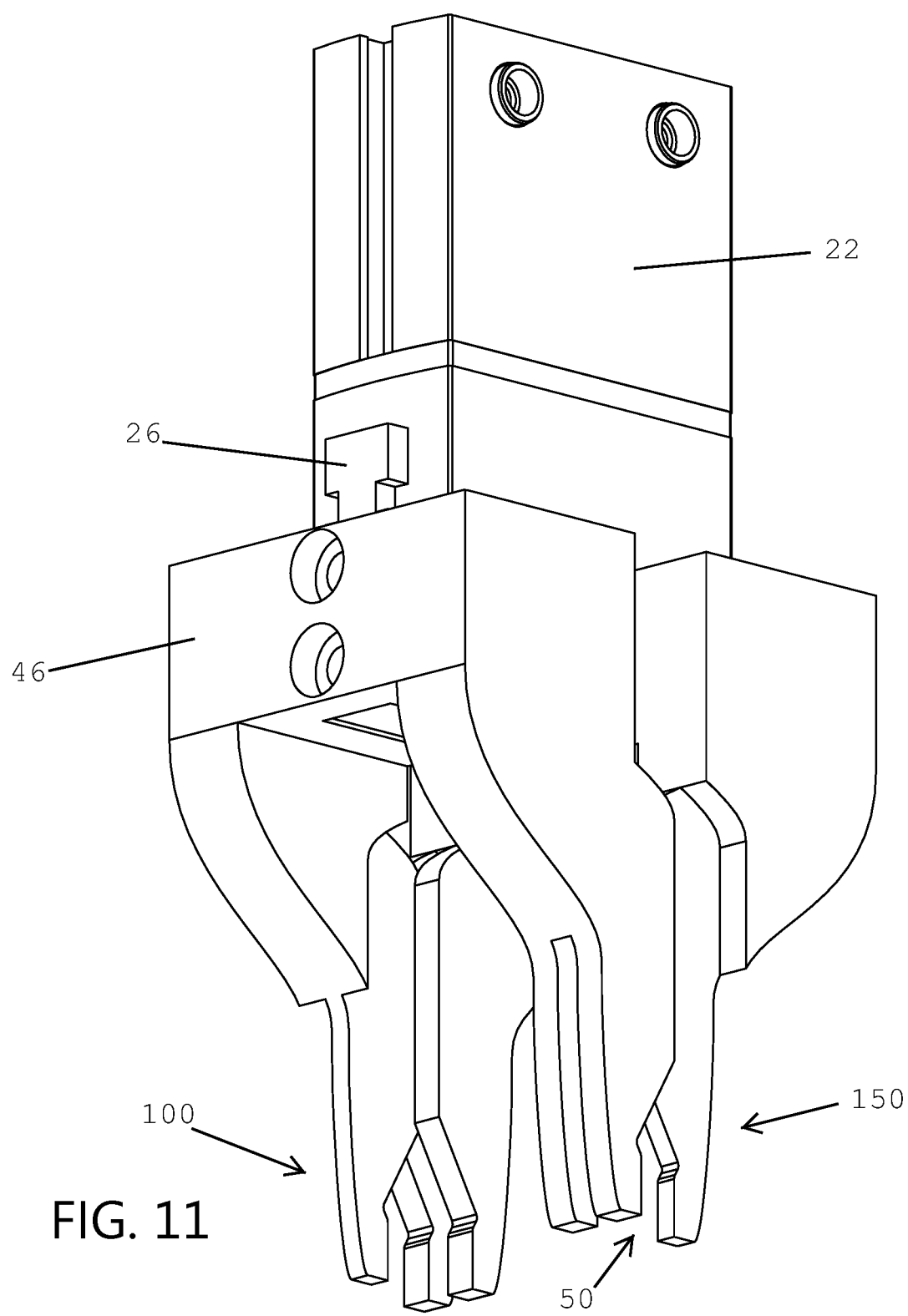
FIG. 11 is a perspective view of the gripper in combination with an actuator in accordance with the present invention shown in an open position.

FIGS. 6-9 further illustrates the gripping device 10 in various orientations showing the gripper 14 in the open and closed positions. FIGS. 6 and 8 show the gripper 14 in the closed position. When the gripper is closed prongs mate with tines in a tongue and groove style joint providing a positive location engagement between the prong and tine. When in the open position, the prongs slide out of the groove formed by the tines. A vertical offset formed in the prongs and tines allows width of the tips of the prong and tine to be reduced. Smaller width tips allow for the picking and placing of wires in horizontal positions with narrow areas for the robotic gripper to place a horizontally oriented object.

Figure 12:
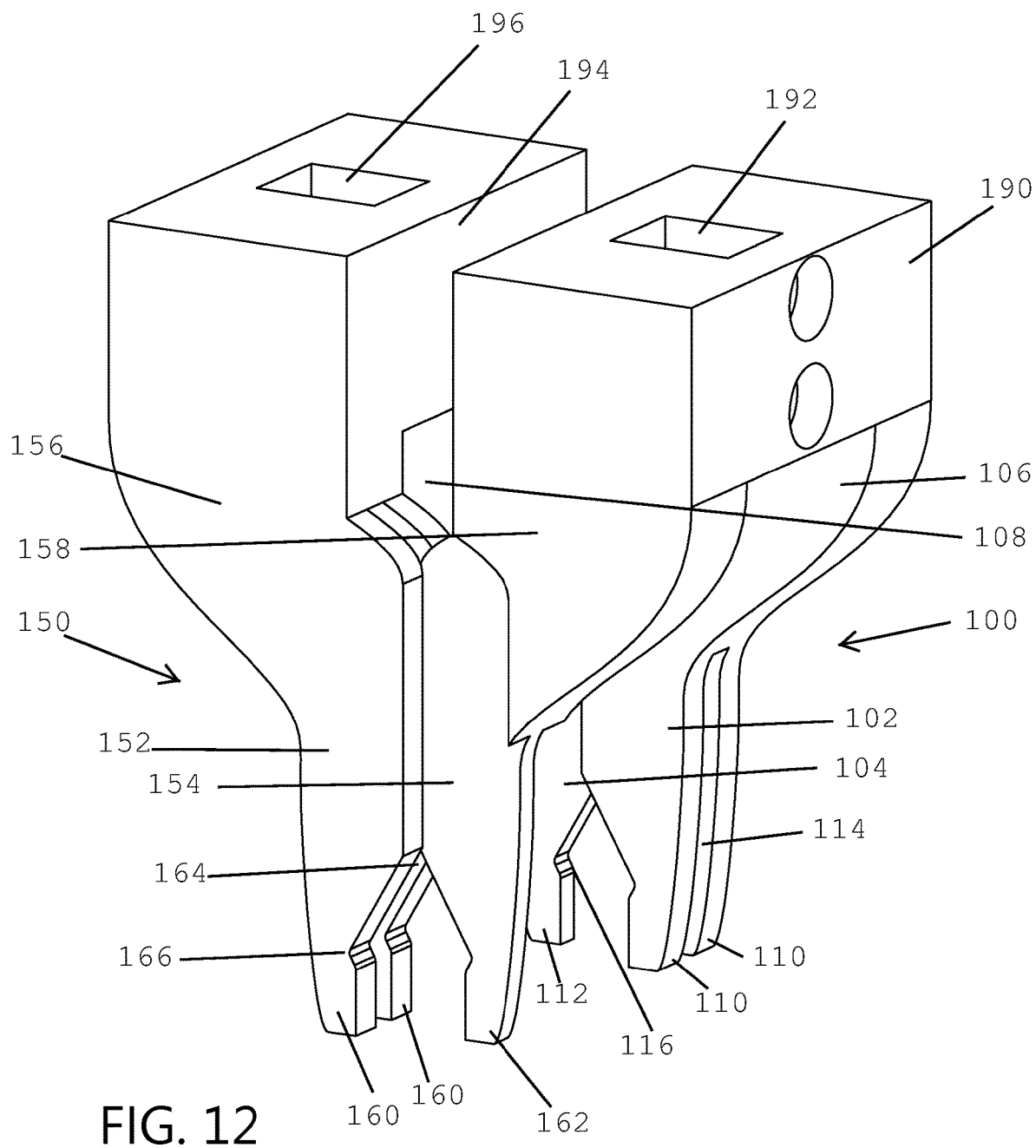
FIG. 12 is a right top end perspective view of grips of a gripper of the present invention shown in an open position.
Figure 13:
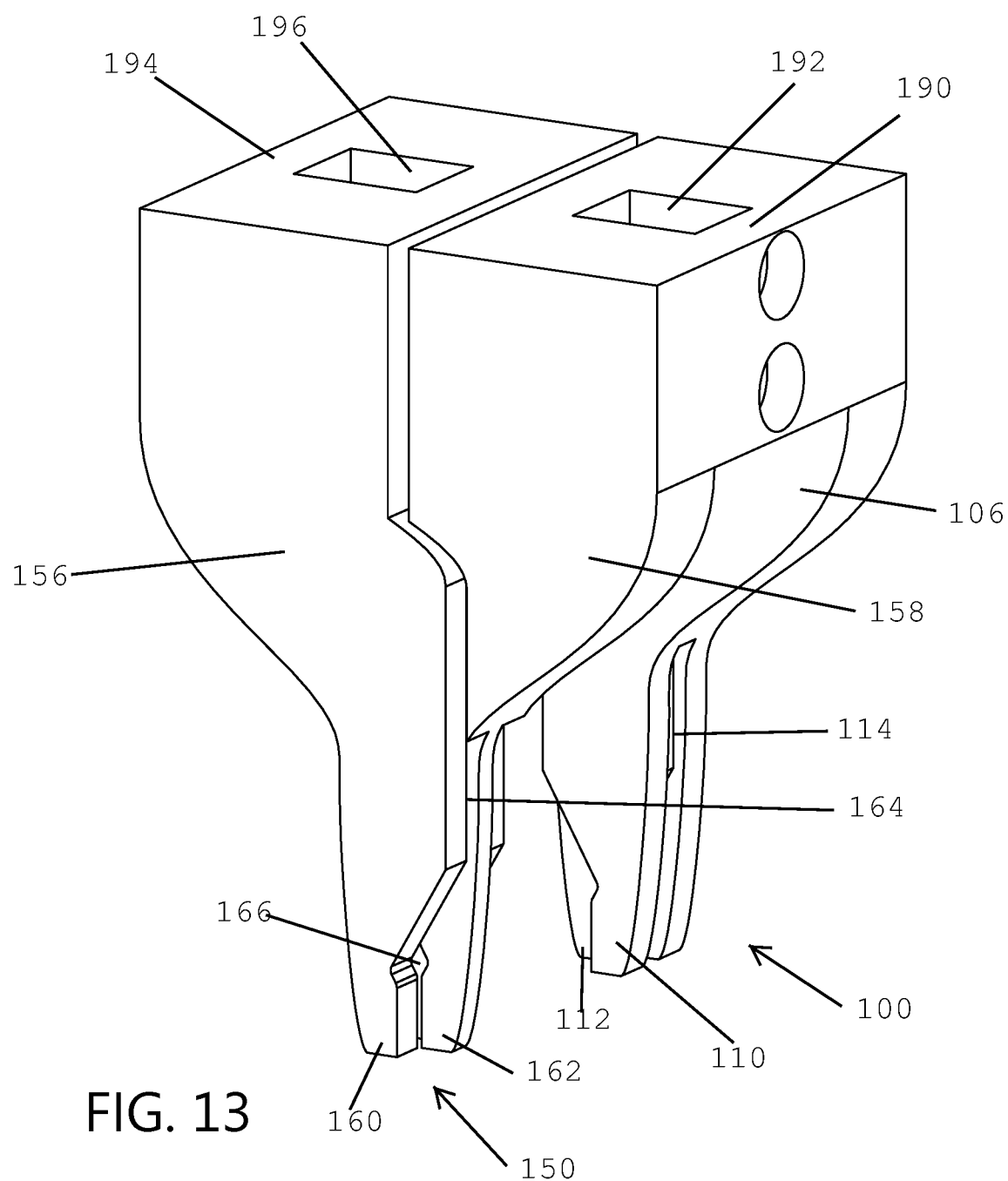
FIG. 13 is a right top end perspective view of grips of a gripper of the present invention shown in a closed position.
Figure 14:
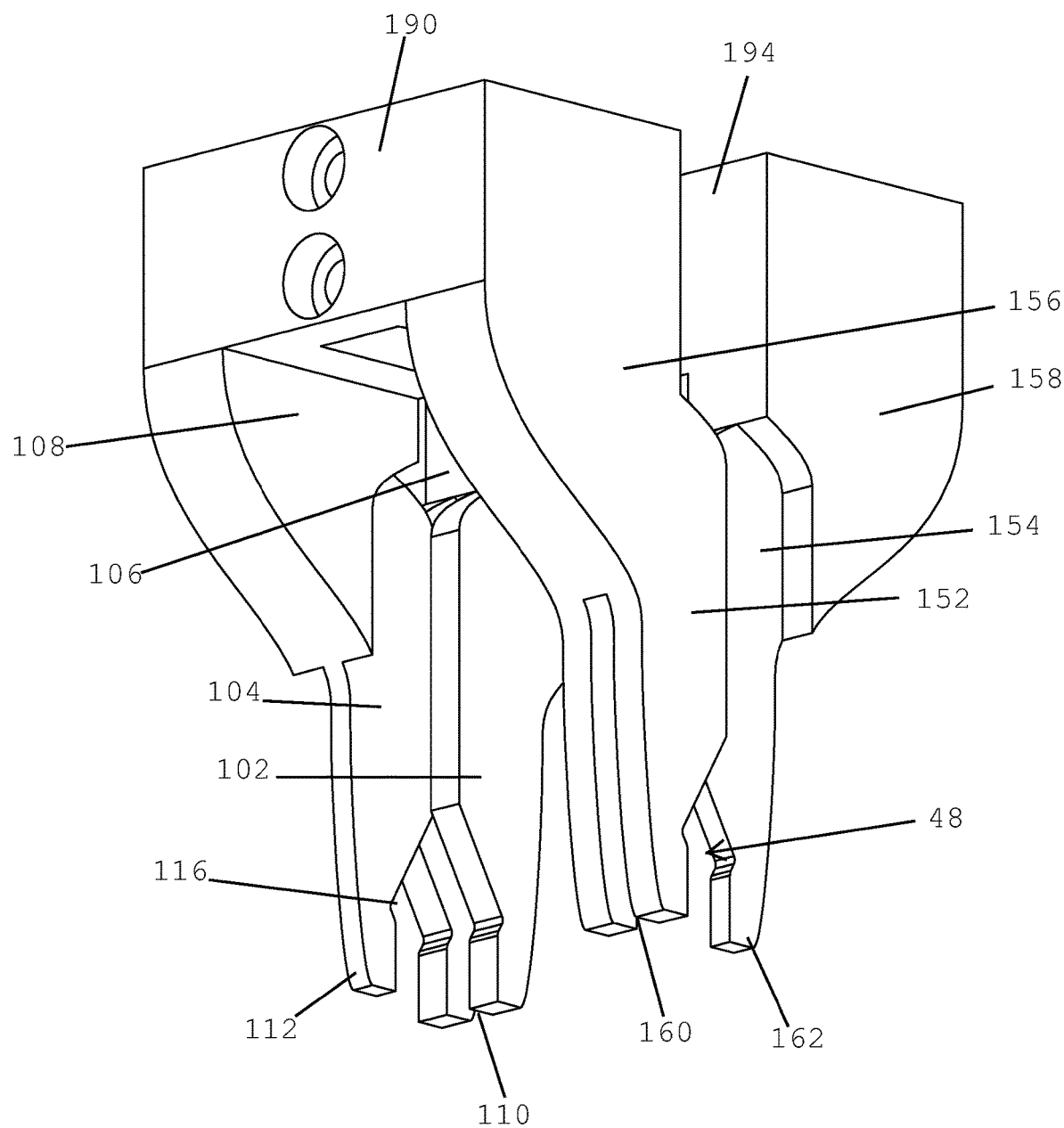
FIG. 14 is a left bottom end perspective view of grips of a gripper of the present invention shown in an open position.
Figure 15:
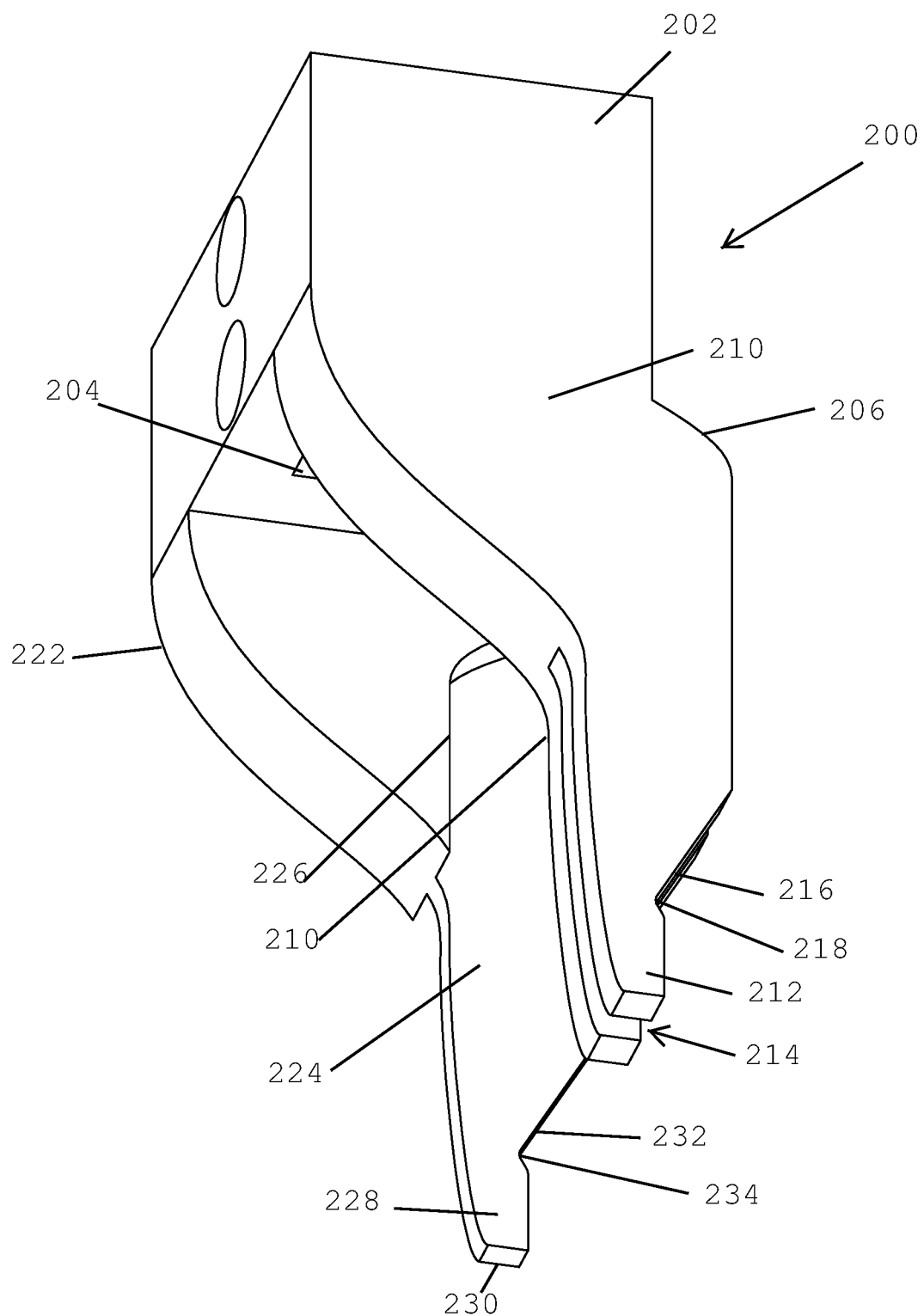
FIG. 15 is a lower back perspective view of a left halve of a gripper of the present invention.
Figure 16:
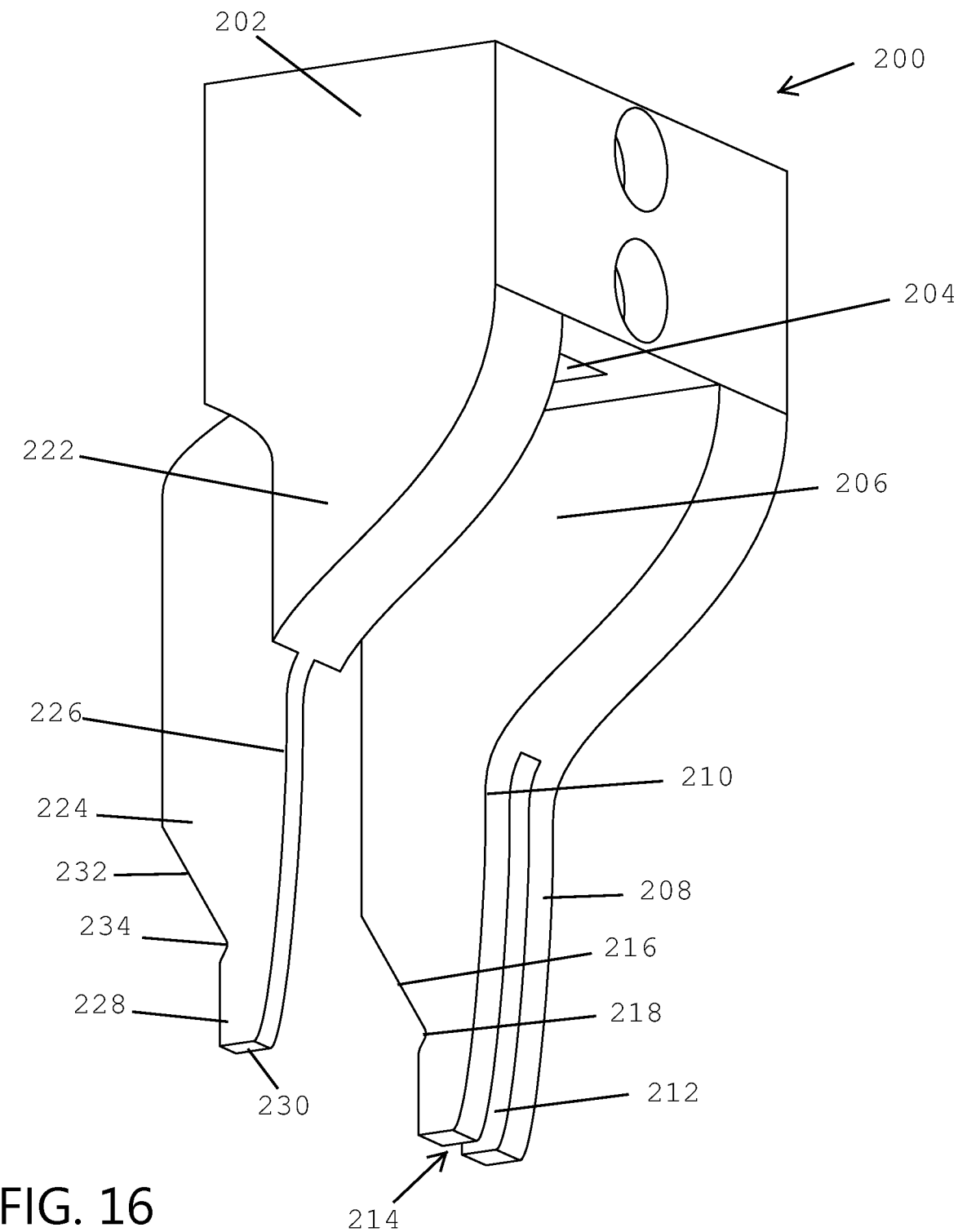
FIG. 16 is a lower back perspective view of a right halve of a gripper of the present invention.
Figure 17:
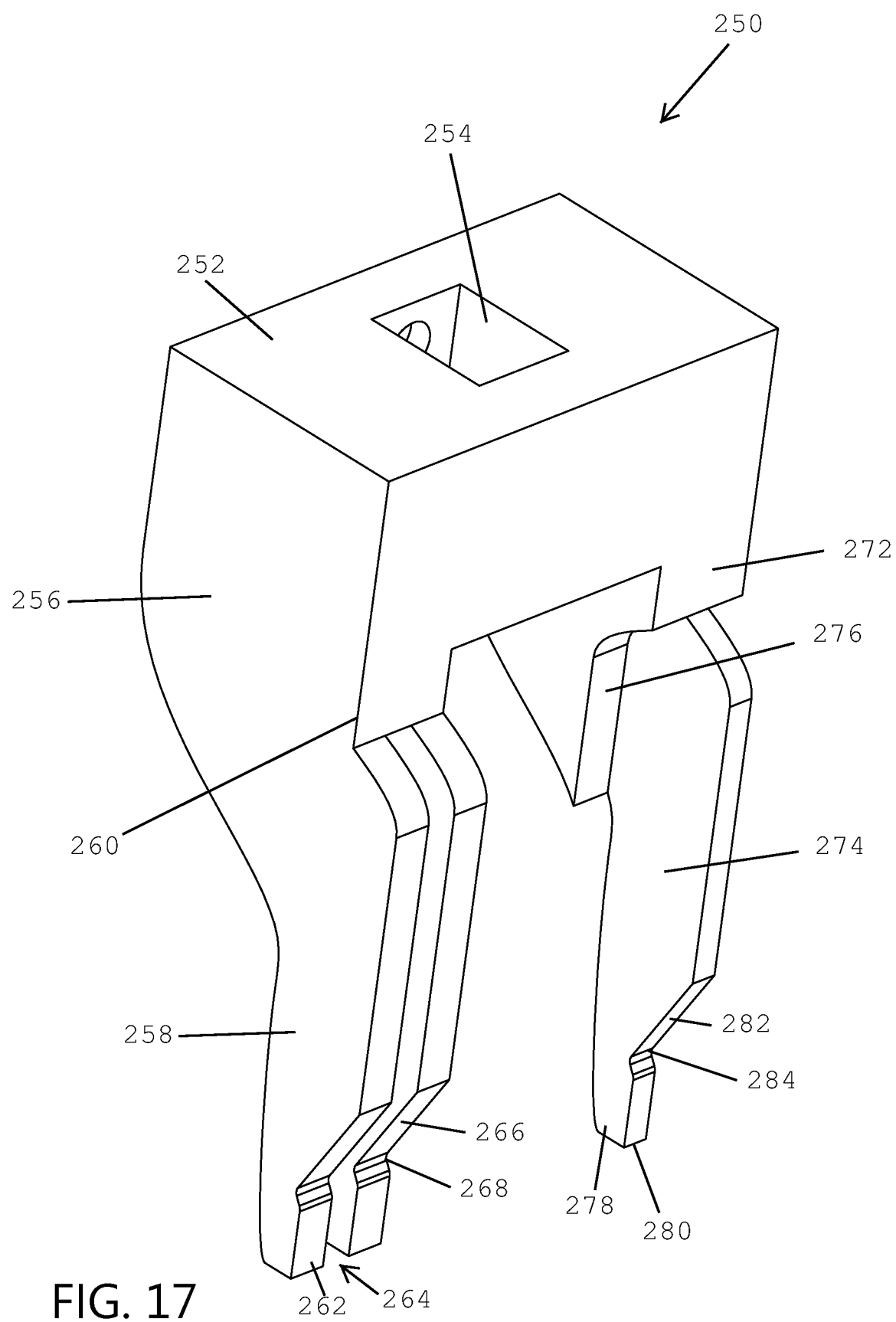
FIG. 17 is an upper front perspective view of a left halve of a gripper of the present invention.
Figure 18:
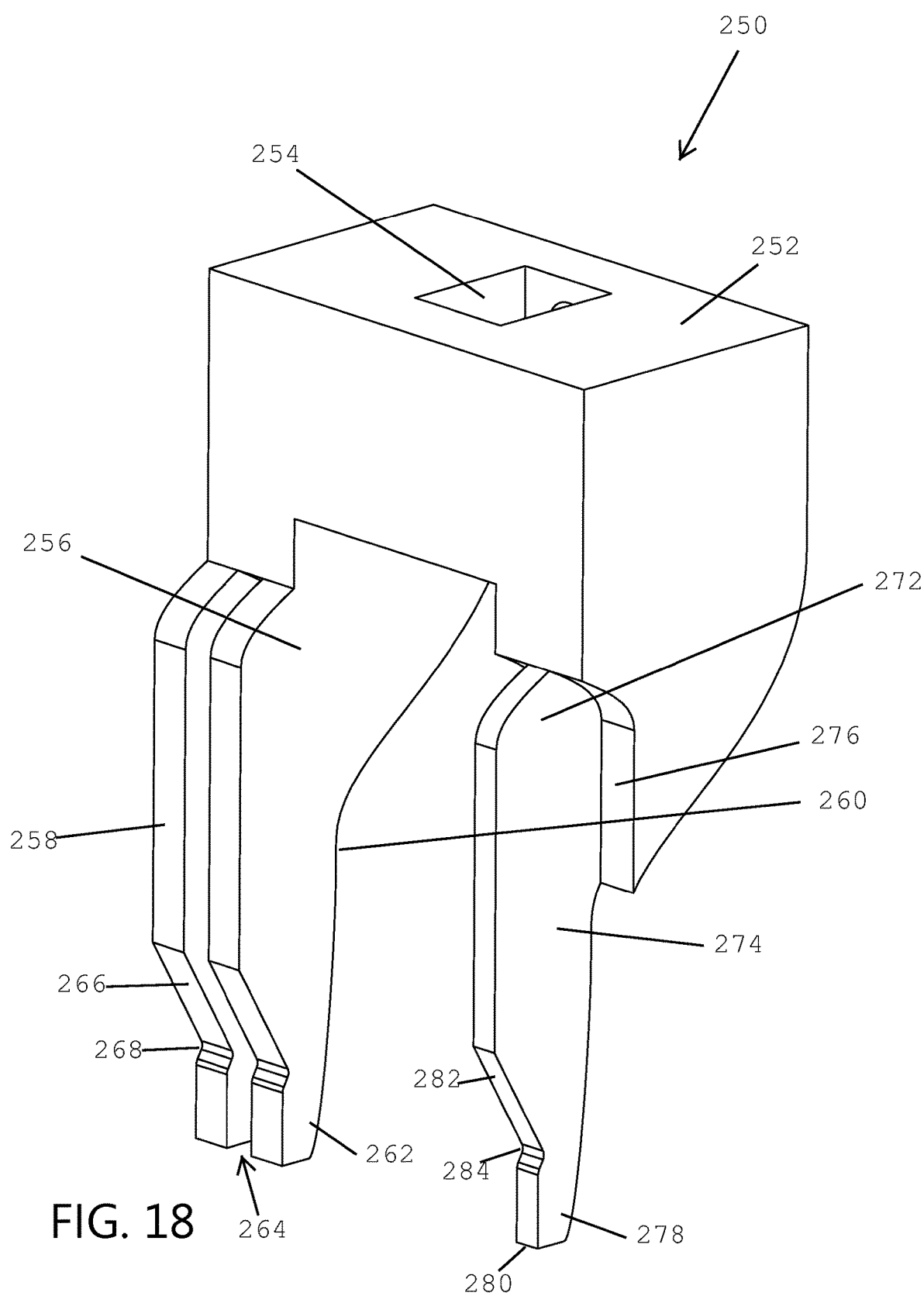
FIG. 18 is an upper front perspective view of a right gripper of the present invention.
Figure 19:
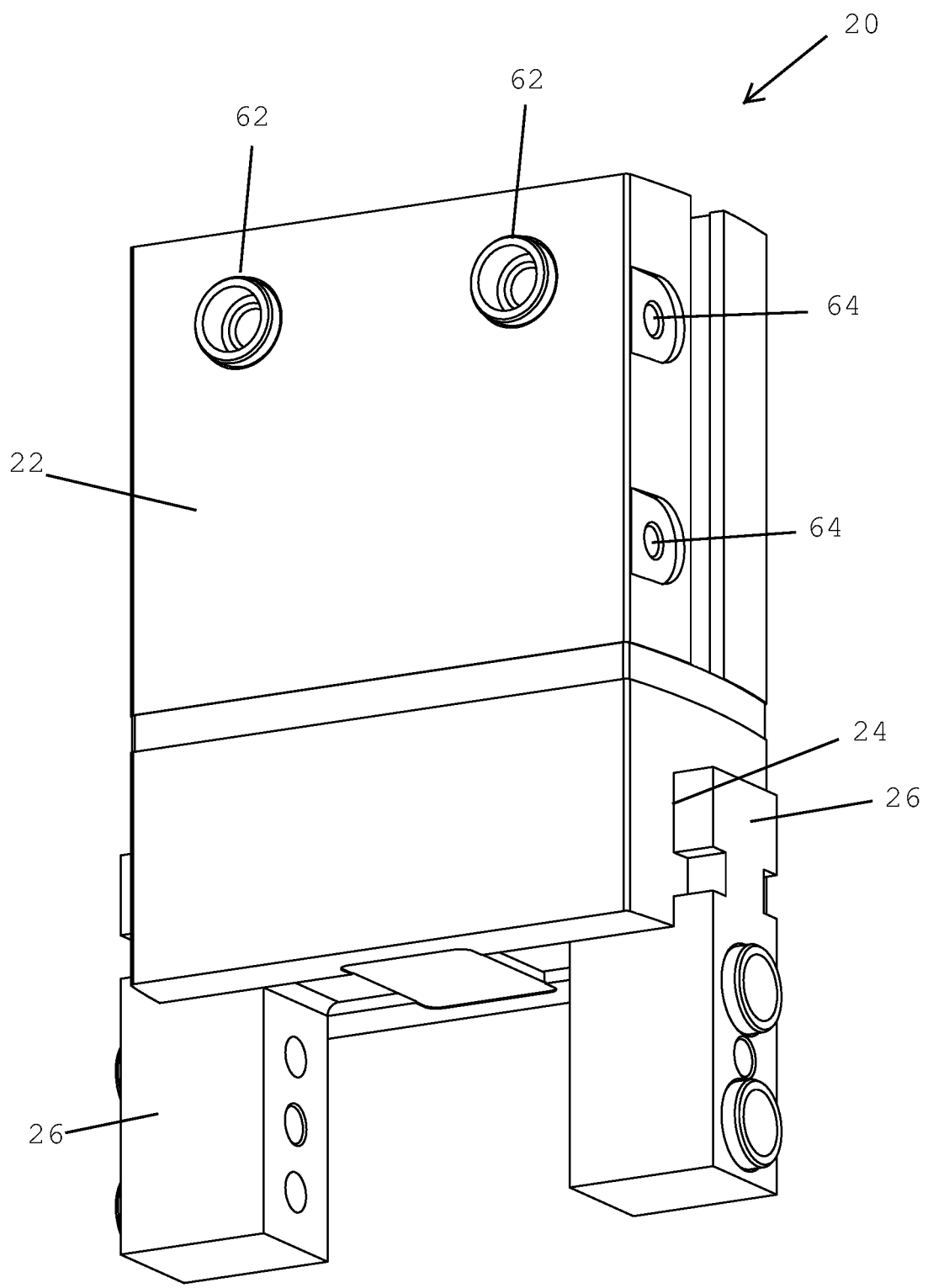
FIG. 19 is a bottom front perspective view of a suitable grip actuator of the object gripping device of the present invention.
Figure 20:
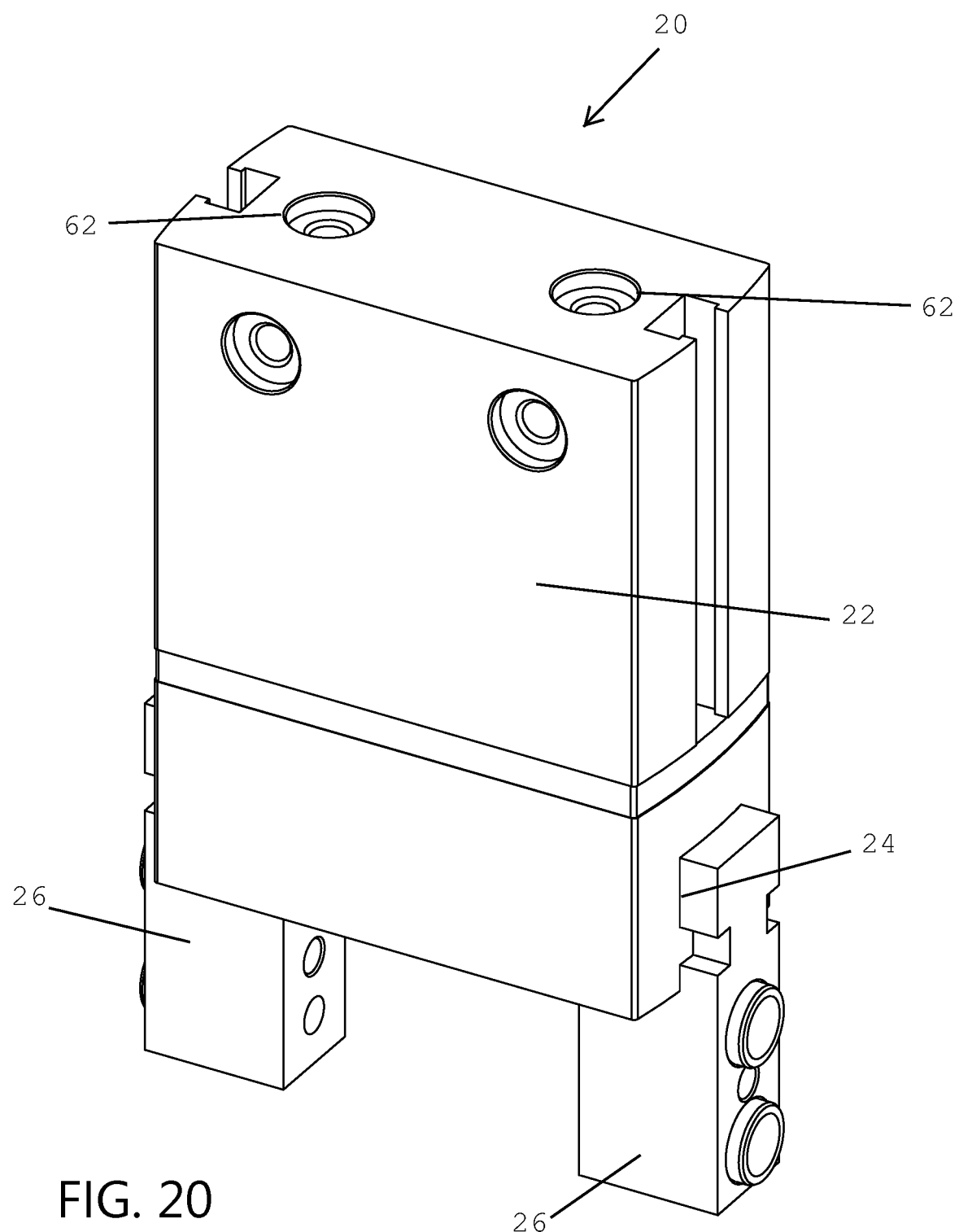
FIG. 20 is a top back perspective view of a suitable grip actuator of the object gripping device of the present invention.

FIGS. 12-14 illustrates the gripper 14 having a first grip 100 and second grip 150. Gripper 14 includes first grip 100 and spaced apart grip 150. The first grip 100 includes a split tine projection 102 and prong projection 104. A base 106 of the split tine 102 and base 108 of the prong 104 are coupled to rigid span 190 and rigid span 194. A tine tip 110 and prong tip 112 are offset from the corresponding base. The spans 190 and 194 are coupled to the jaws 26 of the actuator 20. The split tine and prong come together to form a mating tongue and groove 114 joint. When in the closed position an enclosed notch or opening 166 is formed between the tine and prong of the second grip. Similarly, the second grip 150 includes a split tine projection 152 and prong projection 154. A base 156 of the split tine 152 and base 158 of the prong 154 are coupled to rigid span 190 and rigid span 194. A tine tip 160 and prong tip 162 are offset from the corresponding base. The spans 190 and 194 are coupled to the jaws 26 of the actuator 20. The jaws 26 engage within actuator jaw receptacles 192 and 196 of the first and second spans 190 and 194. The split tine and prong come together to form a mating tongue and groove 164 joint. When in the closed position an enclosed notch or opening 166 is formed between the tine and prong of the second grip. The enclosed notch formed by the grips further restricts the wire from riding up in the gripper and becoming lodged between the projections of the grips.

FIGS. 15-18 illustrates the gripper 14 having a first grip halve 200 and second grip halve 250. Each grip halve includes a prong and tine. The opposing grip halves mate and opposing tines and prongs mate in tongue and groove style joint to create a small diameter opening to grip a horizontally oriented object. Gripper 14 includes first grip halve 200 and spaced apart grip halve 250. The first grip halve 200 includes a base 202 and actuator jaw receptacle 204. The first grip halve further includes first projection 206 and second projection 222. The first projection 206 is in the form of a split tine 208. A narrow tip 212 is offset from the base 202 by a vertical offset 210. The narrow tip of the split tine 208 includes a gap 214 in the tine having a sufficient width to receive a mating prong. The split tine further includes a notch 216 formed on an inner side of the tine and has a vertex 218 centered in the notch. The second projection 222 is in the form of a prong 224 that extends downward from the base 202. The prong 224 has a vertical offset 226 and terminates at a narrow tip 228. The width 230 of the prong tip is minimal to allow for picking and placing of objects in confined locations. The prong 222 further includes a notch 232 formed on an inner side of the prong and has a vertex 234 centered in the notch.

Similarly, the second grip halve 250 includes a base 252 and actuator jaw receptacle 254. The first grip halve further includes first projection 256 and second projection 272. The first projection 256 is in the form of a split tine 258. A narrow tip 262 is offset from the base 252 by a vertical offset 260. The narrow tip of the split tine 258 includes a gap 264 in the tine having a sufficient width receive a mating prong. The split tine 258 further includes a notch 266 formed on an inner side of the tine and has a vertex 268 centered in the notch 266. The second projection 272 is in the form of a prong 274 that extends downward from the base 252. The prong 274 has a vertical offset 276 and terminates at a narrow tip 278. The width 280 of the prong tip is minimal to allow for picking and placing of objects in confined locations. The prong 272 further includes a notch 282 formed on an inner side of the prong and has a vertex 284 centered in the notch. The opposing split tine and prong of each halve come together to form a mating tongue and groove joint. When in the closed position an enclosed notch or opening is formed between the opposing notches of each projection. Those skilled in the art will appreciate that the slope of notches 216, 234, 282, 266 combine to form the enclosed notch or opening when the two grip halves 200 and 250 are in a closed position. As the grip halves are actuated to the closed position the slopes urge the wire to the vertex 166 as shown in FIG. 13. This mechanical feature assures the wire is always in a known orientation and location or position in the gripper. Further, the enclosed notch or opening contains the wire in a fixed position while avoiding pinching or damaging of the wire.

With reference to FIGS. 10 and 11 and FIGS. 19 and 20 the actuator 20 and gripper 14 are shown actuated between an open and closed position 50 and 52. The actuator 20 illustrated in the figures is pneumatically actuated to move jaws 26 between an open and closed position. The pneumatic control housing 22 includes apertures 62 for mounting the actuator 20 to robotic coupling 16 and apertures 64 for coupling pneumatic conduits to the pneumatic control housing 22. The pneumatic control housing further includes guide channels 24 through which jaws 26 slide between open and closed positions. The control housing 22 includes internals mechanisms of known suitable construction such that alternating delivery of compressed air to connections 64, actuates an internal piston backwards and forwards, transferring movement of the piston to the jaws 26. Internal springs may be utilized to further assist the actuation of the jaws 26 between open and closed positions. The jaws 26 are designed to fit within receptacles of the gripper and mounting screws may be utilized to fix the gripper to the jaws.

Figure 21:
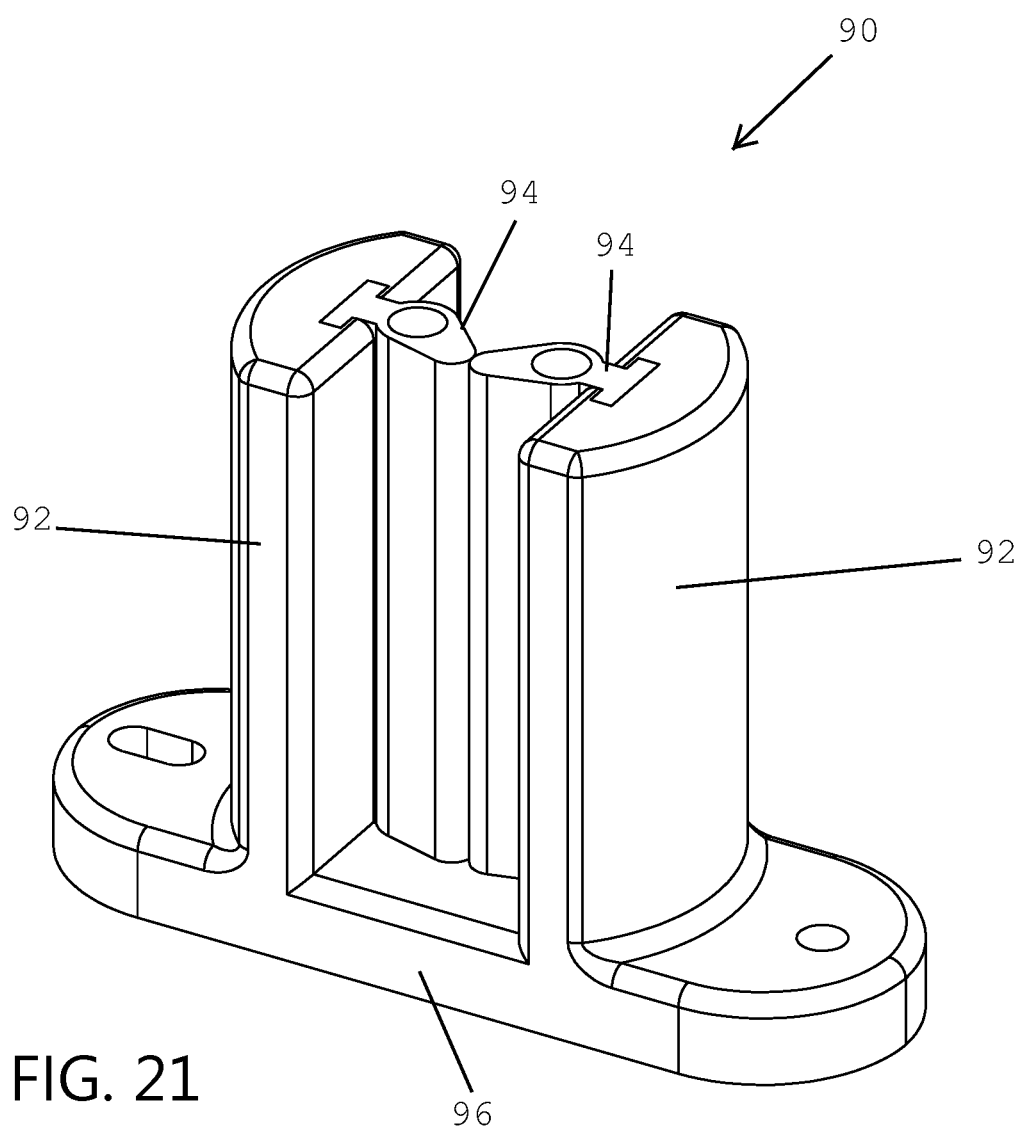
FIG. 21 is a top front perspective view of a peg assembly for use with a wire harness assembly peg board suitable for use with the object gripping device of the present invention.
Figure 22:
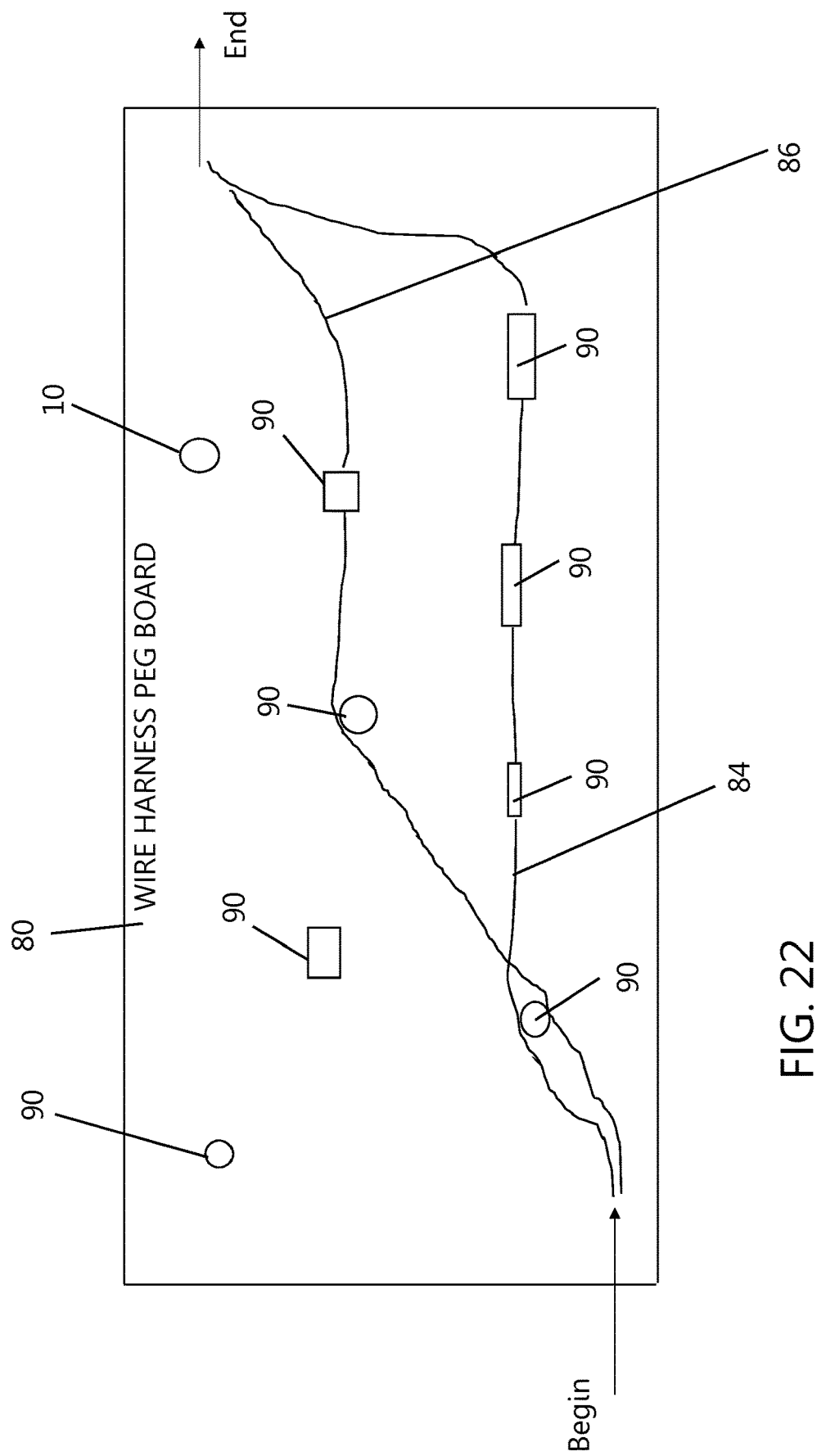
FIG. 22 is a plan view of a wire harness peg board having pegs shown in block diagram form arranged on the peg board and exemplary wires routed around the pegs.

With reference to FIG. 21 a suitable wire harness device or peg 90 is shown. The peg 90 includes a base 96, opposing stanchions or columns 92, and pliable wire retaining members 94. The base 96 is preferably wider than the main body with rounded edges to decrease stresses. The base 96 has one or more attachment points to attach to a work surface or wire harness peg board 80. Multiple pegs 90 may be mounted to the peg board 80 to allow for various routings of wires including those shown for wires 84 and 86 (illustrated in FIG. 22). The base attachment points may include apertures and slots into which a bolt or pin may be inserted to attach the peg to the work surface. Although a peg with 2 stanchions is illustrated, those skilled in the art will appreciate that other configurations are possible without departing from the scope of the invention. The two opposing columns 92 extend upward from the base 96. The columns 92 may be rounded at the edges to reduce sharp corners and to allow routing of wires around the surface without potentially kinking a wire on a sharp edge. Those skilled in the art will appreciate that other shapes are possible.

The portions of the wire retaining members 94 extending from the stanchions are made to grip wire or other workpieces, and are preferably made of a flexible material. An exemplary material is TPU 95A 3D printer filament, although those skilled in the art will appreciate that other materials are possible, such as rubber or foam. When the gates are composed of 3D printable material, the infill percentage may also be increased or decreased in order to increase or decrease the gate flexibility. Those skilled in the art will appreciate that it is possible to modify the shape of the gates to extend from the sidewalls orthogonal to the sidewalls. In this manner the gates may allow bi-directional lateral movement of the wires through the wire retaining device. Further, the spacing between opposing gates may be increased or decreased to allow for the holding of work pieces of varying sizes. Those skilled in the art will appreciate that other various shapes and orientations of the wire retaining members 94 are possible, without departing from the intent of the invention.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A gripping device for use with a robot for gripping and releasing objects, the device comprising:
    a gripper having spaced apart first and second grips; the first grip including spaced apart first and second projections wherein the first projection of the first grip has a split tine and the second projection of the first grip has a single prong; and the second grip including spaced apart first and second projections wherein the first projection of the second grip has a split tine and the second projection of the second grip has a single prong;
    couplings fixed to the first grip and second grip that interconnect the first and second grips;
    an actuator to actuate the dripper between an open and closed position; and
    wherein when the gripper is oriented in the closed position a perimeter of the object is fully contained by the projections of the first and second grips.

2. The gripping device as recited in claim 1, further including a robot coupling suitable for coupling the actuator and gripper to a robot arm.

3. The gripping device as recited in claim 1, wherein the tine of each of the first and second grips includes a notch having a vertex adapted to align along a central axis of a horizontally oriented wire.

4. The gripping device as recited in claim 2, wherein actuation of the gripper simultaneously increases or decreases a distance between opposing first and second projections of the first grip and a distance between opposing first and second projections of the second grip.

5. The gripping device as recited in claim 1, wherein a tip portion of each first and second projection of each first and second grip is narrower than a base portion of each first and second projection of each first and second grip.

6. The gripping device as recited in claim 1, further including an object dispenser coupled to the gripper adjacent the first grip.

7. A gripping device for use with a robot to pick and place wires of a wire harness onto an assembly peg board, the device comprising:
    a gripper having first and second grip halves wherein the first grip halve and second grip halve together form a gripping portion of the gripper and wherein at least one of the first grip halve and second grip halve actuates between an open and closed position;
    the first grip halve including spaced apart first and second projections, wherein the first projection of the first grip halve has a split tine and the second projection of the first grip halve has a single prong;
    the second grip halve including spaced apart first and second projections wherein the first projection of the second grip halve has a split tine and the second projection of the second grip halve has a single prong; and
    wherein the first projection of the first grip halve mates with the second projection of the second grip halve.

8. The gripping device as recited in claim 7, further including an actuator to actuate the gripper between an open and closed position and a robot coupling suitable for coupling the actuator and gripper to a robot arm.

9. The wire gripping device as recited in claim 8, wherein actuation of the gripper increases or decreases the distance between opposing first and second grip halves.

10. The gripping device as recited in claim 7, further including a wire dispenser positioned adjacent a leading grip edge of the gripper.

11. The gripping device as recited in claim 7, further including a filament conduit positioned adjacent a leading grip edge of the gripper.

12. The gripping device as recited in claim 7, wherein the first projection of the first grip halve is aligned adjacent the second projection of the second grip halve and the first projection of the second grip halve is aligned adjacent a second projection of the first grip halve.

13. The gripping device as recited in claim 7, further wherein the second projection of the first grip halve mates with the first projection of the second grip halve.

14. The gripping device as recited in claim 7, wherein the tine of the first grip halve and the tine of the second grip halve includes notches having vertexes adapted to align along a central axis of a horizontally oriented wire.

15. The wire gripping device as recited in claim 7, wherein a tip portion of each first and second projection of each first and second grip halve is offset from a center of a base portion of each first and second projection of each first and second grip halve.

16. A method of delivering and placing a filament in a desired location of an automated workplace, the method comprising the steps of:
    providing a gripper having a leading grip edge and a trailing grip edge, wherein the gripper is adapted for picking and placing a horizontally oriented filament, the gripper including:
    first and second grip halves that together form a gripping portion of the gripper and that actuate between an open and a closed position;
    the first grip halve including spaced apart first and second projections wherein the first projection has a split tine and the second projection has a single prong;
    the second grip halve including spaced apart first and second projections wherein the first projection has a split tine and the second projection has a single prong, wherein the first projection of the first grip halve is aligned adjacent the leading grip edge of the gripper and the first projection of the second grip halve is aligned adjacent the trailing edge of the gripper;

loading a filament into a filament dispenser positioned adjacent to the leading grip edge of the gripper;

gripping an end of the filament with the gripper;

fixing the end of the filament within the workplace at a first position;

releasing a grip on the filament and moving the gripper to a second position while maintaining the filament dispenser at a leading travel edge of the gripper; and re-gripping the filament.

17. The method as recited in claim 16, further including the step of placing filament on a peg board using a passive, bi-directional filament retaining peg.

\* \* \* \* \*